(12) United States Patent
Hotta et al.

(10) Patent No.: US 11,807,234 B2
(45) Date of Patent: Nov. 7, 2023

(54) AUTOMATED DRIVING TRAJECTORY GENERATING DEVICE AND AUTOMATED DRIVING DEVICE

(71) Applicant: TOYOTA JIDOSHA KABUSHIKI KAISHA, Toyota (JP)

(72) Inventors: Daichi Hotta, Tokyo (JP); Taichi Kawanai, Susono (JP); Yusuke Hayashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 17/470,330

(22) Filed: Sep. 9, 2021

(65) Prior Publication Data

US 2022/0153263 A1   May 19, 2022

(30) Foreign Application Priority Data

Nov. 17, 2020   (JP) ................................ 2020-191028

(51) Int. Cl.
*B60W 30/095* (2012.01)
*B60W 40/04* (2006.01)

(52) U.S. Cl.
CPC ........ *B60W 30/0956* (2013.01); *B60W 40/04* (2013.01); *B60W 2520/10* (2013.01); *B60W 2520/12* (2013.01); *B60W 2554/4041* (2020.02); *B60W 2554/4042* (2020.02); *B60W 2554/4043* (2020.02); *B60W 2554/4044* (2020.02); *B60W 2554/801* (2020.02); *B60W 2555/60* (2020.02)

(58) Field of Classification Search
CPC ............ B60W 30/0956; B60W 40/04; B60W 2520/10; B60W 2520/12; B60W 2554/4041; B60W 2554/4042; B60W 2554/4043; B60W 2554/4044; B60W 2554/801; B60W 2555/60; G05D 1/0257; G05D 2201/0212
See application file for complete search history.

(56) References Cited

U.S. PATENT DOCUMENTS

| 10,739,775 | B2 * | 8/2020 | Sun ...................... G05D 1/0088 |
| 11,554,794 | B2 * | 1/2023 | Schur .............. B60W 60/00272 |
| 2020/0082248 | A1 * | 3/2020 | Villegas ................. G06N 3/044 |
| 2021/0302974 | A1 * | 9/2021 | Di Cairano ........ B60W 60/0011 |

FOREIGN PATENT DOCUMENTS

JP      2008-158969 A     7/2008

* cited by examiner

*Primary Examiner* — Peter D Nolan
*Assistant Examiner* — Anwar Mohamed
(74) *Attorney, Agent, or Firm* — Sughrue Mion, PLLC

(57) ABSTRACT

An automated driving trajectory generating device is configured to: recognize a mobile object which is located near a vehicle; calculate a host vehicle path for automated driving of the vehicle and a plurality of predicted paths of the mobile object based on a position of the vehicle on a map, a position of the mobile object on the map, and map information; calculate a predicted acceleration which is generated in the mobile object moving along a predicted path for each predicted path based on the plurality of predicted paths and a vehicle speed of the mobile object; identify a target path which is a predicted path used to generate the trajectory out of the plurality of predicted paths based on a result of comparison between the predicted acceleration and an acceleration threshold value; and generate the trajectory based on the host vehicle path and the target path.

6 Claims, 12 Drawing Sheets

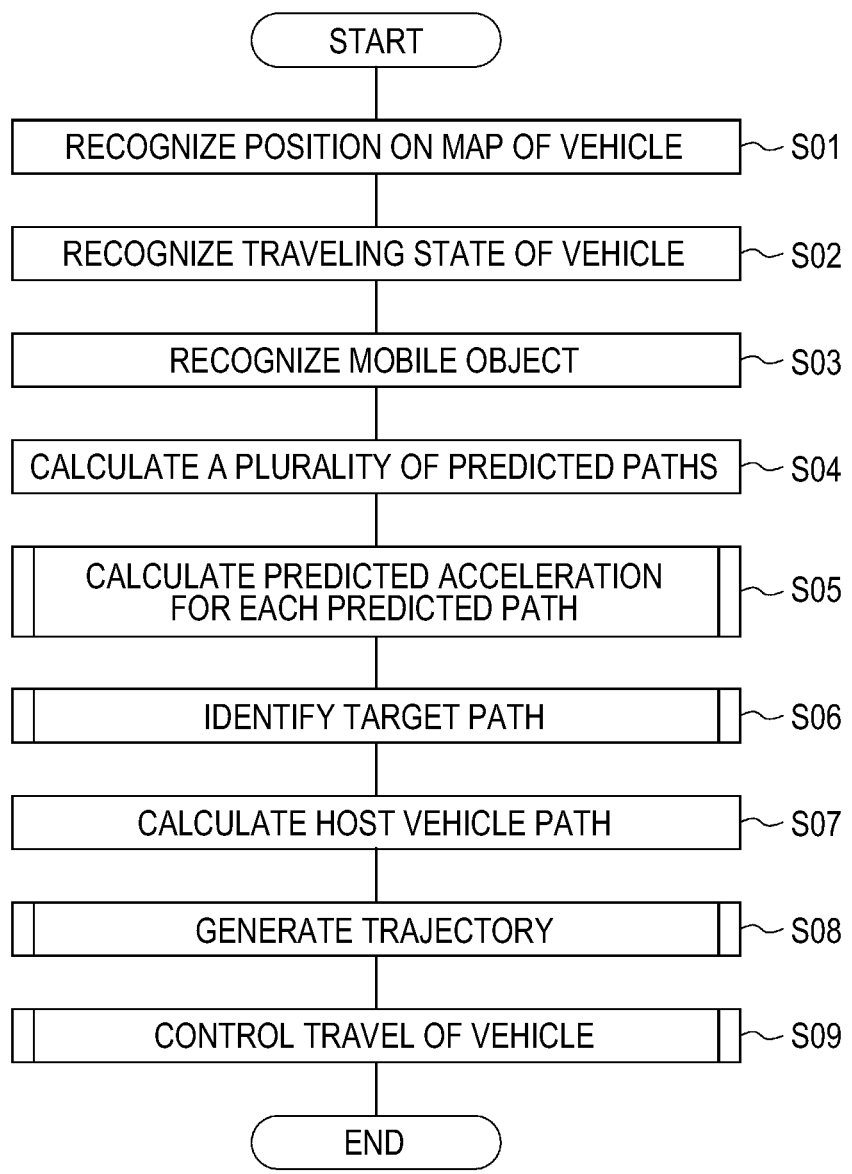

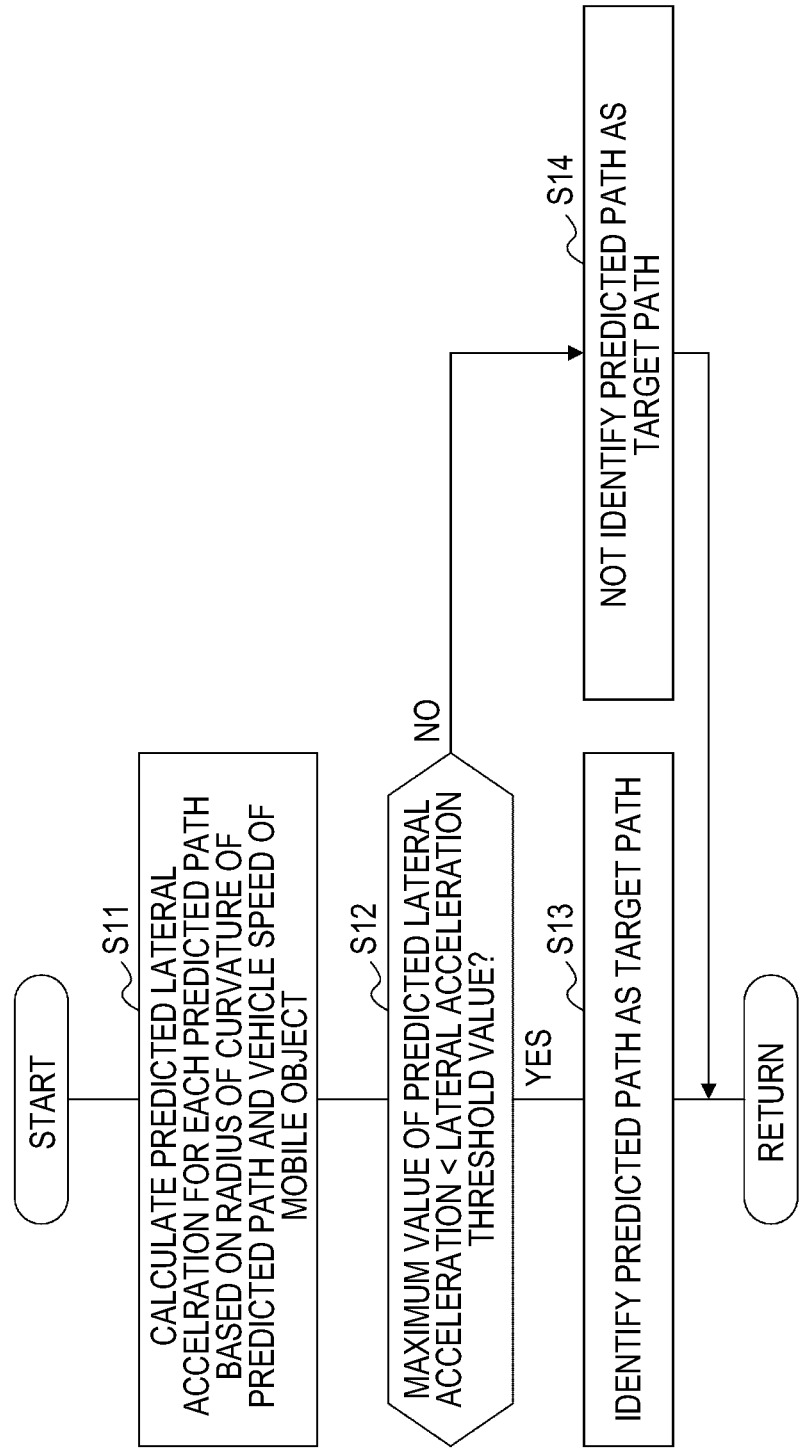

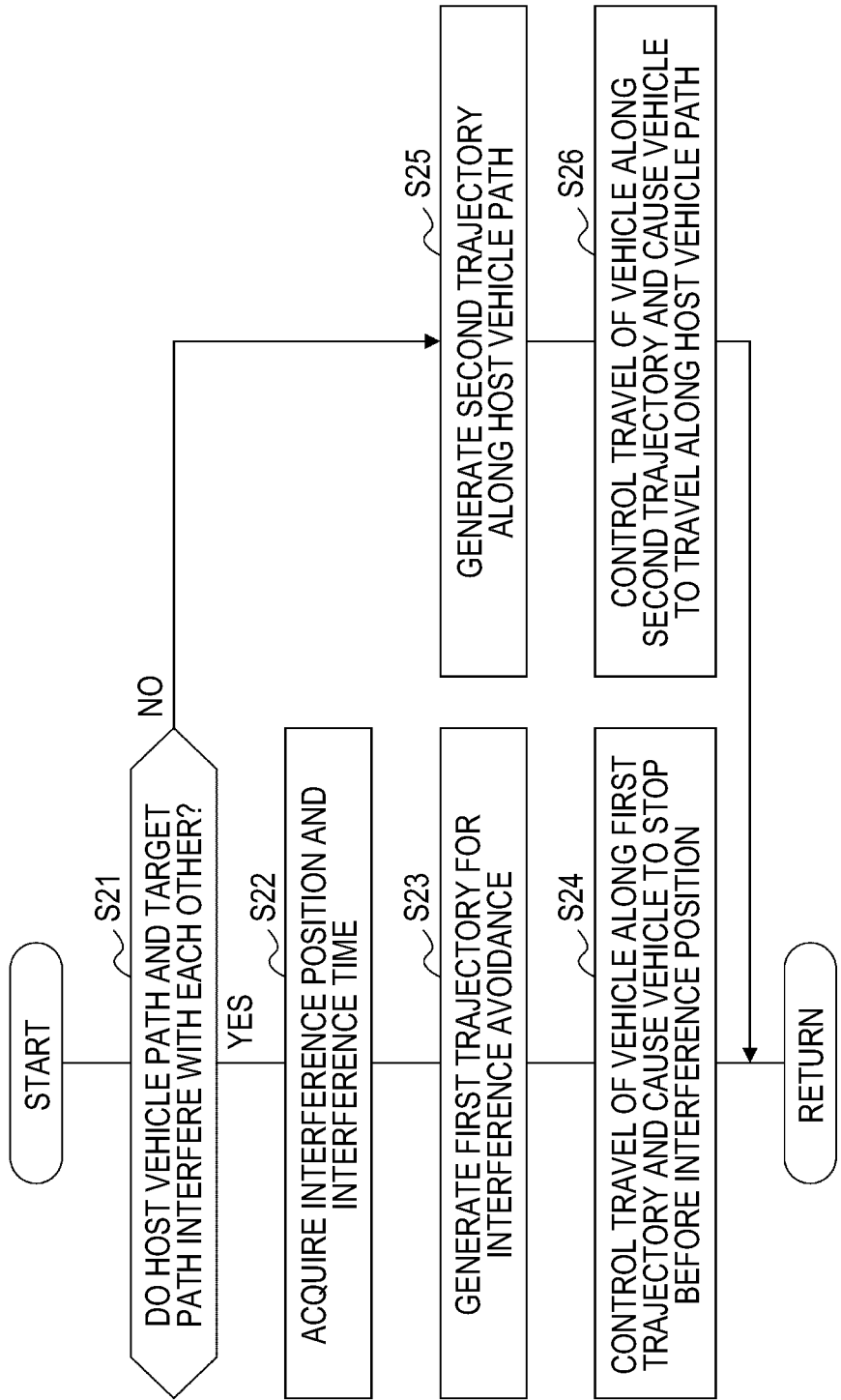

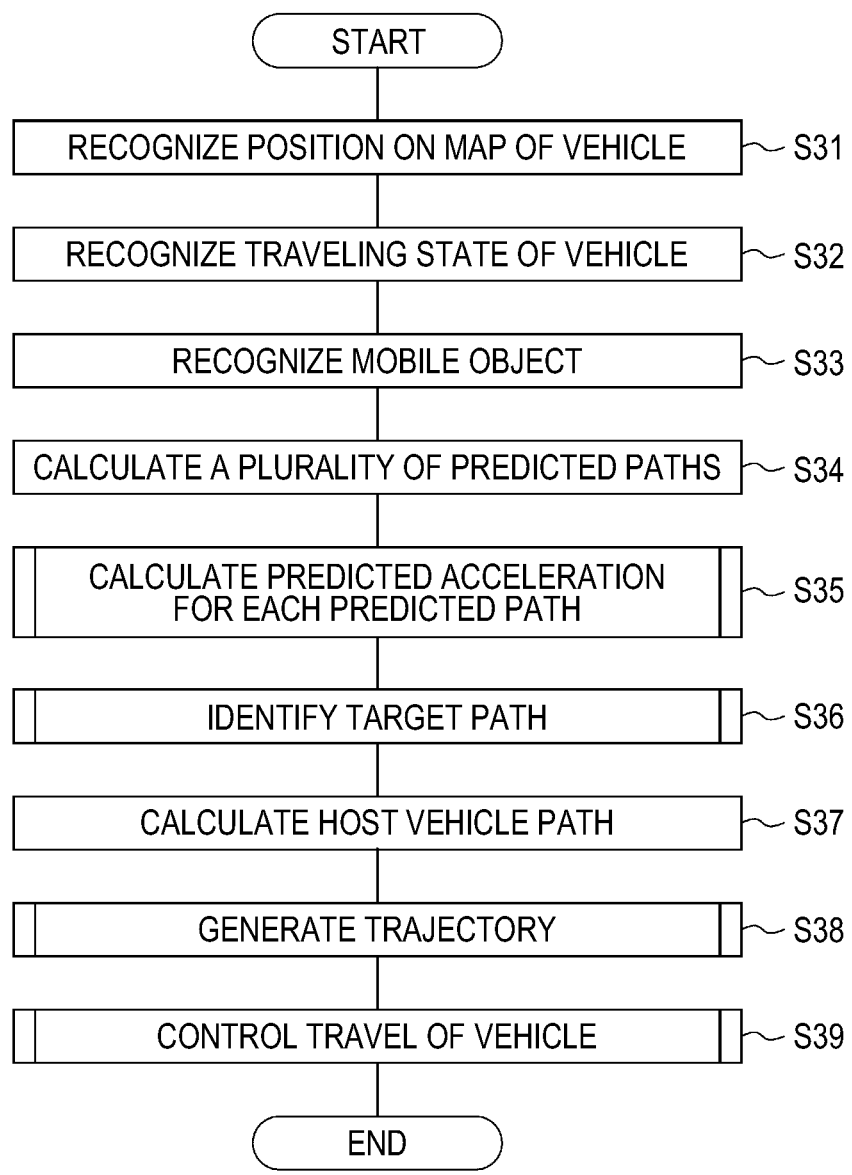

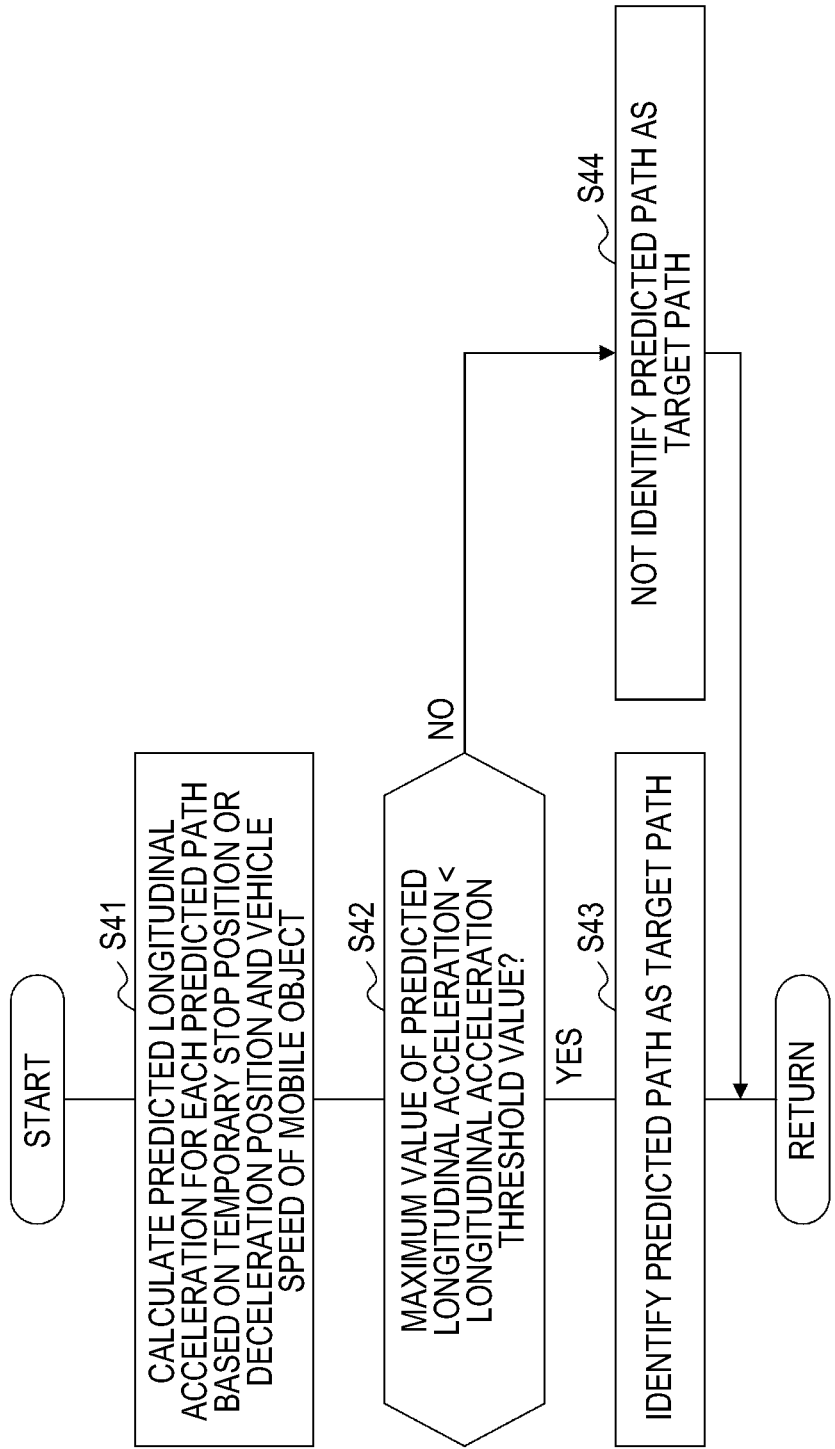

AUTOMATED DRIVING TRAJECTORY GENERATING DEVICE AND AUTOMATED DRIVING DEVICE

CROSS-REFERENCE TO RELATED APPLICATION

This application claims priority to Japanese Patent Application No. 2020-191028 filed on Nov. 17, 2020, incorporated herein by reference in its entirety.

BACKGROUND

1. Technical Field

The disclosure relates to an automated driving trajectory generating device and an automated driving device.

2. Description of Related Art

In the related art, Japanese Unexamined Patent Application Publication No. 2008-158969 (JP 2008-158969 A) is known as technical literature associated with generation of a trajectory of automated driving. In this publication, a device that calculates a collision probability between a host vehicle and another vehicle by calculating a path interfering with a path of the host vehicle out of predicted paths which can be selected by the other vehicle is described.

SUMMARY

When a plurality of predicted paths of a mobile object is calculated based on a position of the mobile object on a map and map information, the mobile object may not actually move along a predicted path depending on the behavior of a speed of the mobile object or the like and the feasibility of the predicted path may be low. When a predicted path of a mobile object is used to generate a trajectory of a host vehicle (a vehicle), an influence of such a predicted path with low feasibility can be thought to be small. Accordingly, it is preferable to generate a trajectory for automated driving of a vehicle according to the feasibility of a predicted path.

In the related art, there is demand for providing of an automated driving trajectory generating device and an automated driving device that can appropriately generate a trajectory for automated driving according to the feasibility of a predicted path of a mobile object located near a vehicle.

According to an aspect of the disclosure, there is provided an automated driving trajectory generating device that generates a trajectory for automated driving of a vehicle, the automated driving trajectory generating device including: a mobile object recognizing unit configured to recognize a mobile object which is located near the vehicle; a path calculating unit configured to calculate a host vehicle path for automated driving of the vehicle and a plurality of predicted paths of the mobile object based on a position of the vehicle on a map, a position of the mobile object on the map, and map information; a predicted acceleration calculating unit configured to calculate a predicted acceleration which is generated in the mobile object moving along a predicted path for each predicted path based on the plurality of predicted paths and a vehicle speed of the mobile object; a target path identifying unit configured to identify a target path which is a predicted path used to generate the trajectory out of the plurality of predicted paths based on a result of comparison between the predicted acceleration and an acceleration threshold value; and a trajectory generating unit configured to generate the trajectory based on the host vehicle path and the target path.

With the automated driving trajectory generating device according to the aspect of the disclosure, a predicted acceleration of a mobile object is calculated for each predicted path based on a plurality of predicted paths and a vehicle speed of the mobile object. A target path which is a predicted path used to generate the trajectory out of the predicted paths is identified based on a result of comparison between the predicted acceleration and the acceleration threshold value. The trajectory is generated based on the host vehicle path and the target path. In this way, since the target path identified based on the result of comparison between the predicted acceleration and the acceleration threshold value is used, it is possible to generate a trajectory in consideration of the feasibility of a predicted path of a mobile object. Accordingly, in comparison with a case in which the feasibility of the predicted path of the mobile object is not considered, it is possible to more appropriately generate a trajectory for automated driving.

In the automated driving trajectory generating device according to the aspect of the disclosure, the predicted acceleration calculating unit may be configured to calculate a predicted lateral acceleration which is generated in the mobile object moving along a predicted path for each predicted path based on a radius of curvature of the predicted path and the vehicle speed of the mobile object, and the target path identifying unit may be configured to identify a predicted path in which a maximum value of the predicted lateral acceleration is less than a lateral acceleration threshold value out of the plurality of predicted paths as the target path. In this case, it is possible to more appropriately generate a trajectory for automated driving based on knowledge that the feasibility of a predicted path in which the maximum value of the predicted lateral acceleration generated in the mobile object is equal to or greater than the lateral acceleration threshold value is low.

In the automated driving trajectory generating device according to the aspect of the disclosure, the predicted acceleration calculating unit may be configured to calculate a predicted longitudinal acceleration which is generated in the mobile object moving along a predicted path for each predicted path based on a temporary stop position or a deceleration position of the mobile object which is located in the predicted path and the vehicle speed of the mobile object, and the target path identifying unit may be configured to identify a predicted path in which a maximum value of the predicted longitudinal acceleration is less than a longitudinal acceleration threshold value out of the plurality of predicted paths as the target path. In this case, it is possible to more appropriately generate a trajectory for automated driving based on knowledge that the feasibility of a predicted path in which the maximum value of the predicted longitudinal acceleration generated in the mobile object is equal to or greater than the longitudinal acceleration threshold value is low.

In the automated driving trajectory generating device according to the aspect of the disclosure, the map information may include priority information for determining priorities under traffic regulations for a plurality of vehicles, and the target path identifying unit may be configured to additionally identify a predicted path in which the priority of the mobile object is equal to or higher than the priority of the vehicle out of the plurality of predicted paths as the target path. In this case, it is possible to more appropriately generate a trajectory for automated driving based on knowledge that the feasibility of a predicted path in which the priority of the mobile object is less than the priority of the vehicle is low.

In the automated driving trajectory generating device according to the aspect of the disclosure, the mobile object recognizing unit may be configured to recognize a direction indication of the mobile object, and the target path identifying unit may be configured to additionally identify a predicted path extending in a direction identified by the direction indication out of the plurality of predicted paths as the target path. In this case, it is possible to more appropriately generate a trajectory for automated driving based on knowledge that the feasibility of a predicted path which extends in a direction which is not identified by the direction indication is low.

In the automated driving trajectory generating device according to the aspect of the disclosure, the mobile object recognizing unit may be configured to recognize a bias of a lateral position in a direction crossing a traveling direction of the mobile object, and the target path identifying unit may be configured to additionally identify a predicted path extending in a direction corresponding to the bias of the lateral position out of the plurality of predicted paths as the target path. In this case, it is possible to more appropriately generate a trajectory for automated driving based on knowledge that the feasibility of a predicted path which extends in a direction not corresponding to the bias of the lateral position is low.

According to another aspect of the disclosure, there is provided an automated driving device that causes a vehicle to travel along a generated trajectory by automated driving, the automated driving device including: a mobile object recognizing unit configured to recognize a mobile object which is located near the vehicle; a path calculating unit configured to calculate a host vehicle path for automated driving of the vehicle and a plurality of predicted paths of the mobile object based on a position of the vehicle on a map, a position of the mobile object on the map, and map information; a predicted acceleration calculating unit configured to calculate a predicted acceleration which is generated in the mobile object moving along a predicted path for each predicted path based on the plurality of predicted paths and a vehicle speed of the mobile object; a target path identifying unit configured to identify a target path which is a predicted path used to generate the trajectory out of the plurality of predicted paths based on a result of comparison between the predicted acceleration and an acceleration threshold value; a trajectory generating unit configured to generate the trajectory based on the host vehicle path and the target path; and a travel control unit configured to cause the vehicle to travel along the trajectory by automated driving, wherein the trajectory generating unit is configured to calculate an interference position between the host vehicle path and the target path when the host vehicle path and the target path interfere with each other and to generate an interference avoidance trajectory which is a trajectory in which the vehicle is stopped before the interference position based on the vehicle speed of the vehicle, the host vehicle path, and the interference position, and wherein the travel control unit is configured to decelerate the vehicle along the interference avoidance trajectory.

With the automated driving device according to the aspect of the disclosure, a predicted acceleration of a mobile object is calculated for each predicted path based on a plurality of predicted paths and a vehicle speed of the mobile object. A target path which is a predicted path used to generate the trajectory out of the predicted paths is identified based on a result of comparison between the predicted acceleration and the acceleration threshold value. The trajectory is generated based on the host vehicle path and the target path. In this way, since the target path identified based on the result of comparison between the predicted acceleration and the acceleration threshold value is used, it is possible to generate a trajectory in consideration of the feasibility of a predicted path of a mobile object. Accordingly, in comparison with a case in which the feasibility of the predicted path of the mobile object is not considered, it is possible to more appropriately generate a trajectory for automated driving. With the automated driving device according to the aspect of the disclosure, when the host vehicle path and the target path interfere with each other, an interference avoidance trajectory is generated and the vehicle is decelerated along the interference avoidance trajectory. Accordingly, the vehicle is stopped before the interference position. In this way, since the vehicle is decelerated in consideration of the feasibility of a predicted path of the mobile object, it is possible to more appropriately decelerate the vehicle in comparison with a case in which the feasibility of the predicted path of the mobile object is not considered.

According to some aspects of the disclosure, it is possible to appropriately generate a trajectory for automated driving according to the feasibility of a predicted path of a mobile object located near a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating an example of an automated driving process which is performed by an ECU illustrated in FIG. 1;

FIG. 4 is a flowchart illustrating an example of processes of S05 and S06 in FIG. 3;

FIG. 5 is a flowchart illustrating an example of processes of S08 and S09 in FIG. 3;

FIG. 8 is a flowchart illustrating an example of an automated driving process which is performed by an ECU illustrated in FIG. 6;

FIG. 9 is a flowchart illustrating an example of processes of S35 and S36 in FIG. 8;

DETAILED DESCRIPTION OF EMBODIMENTS

Hereinafter, embodiments of the disclosure will be described with reference to the accompanying drawings.

First Embodiment

Figure 1:
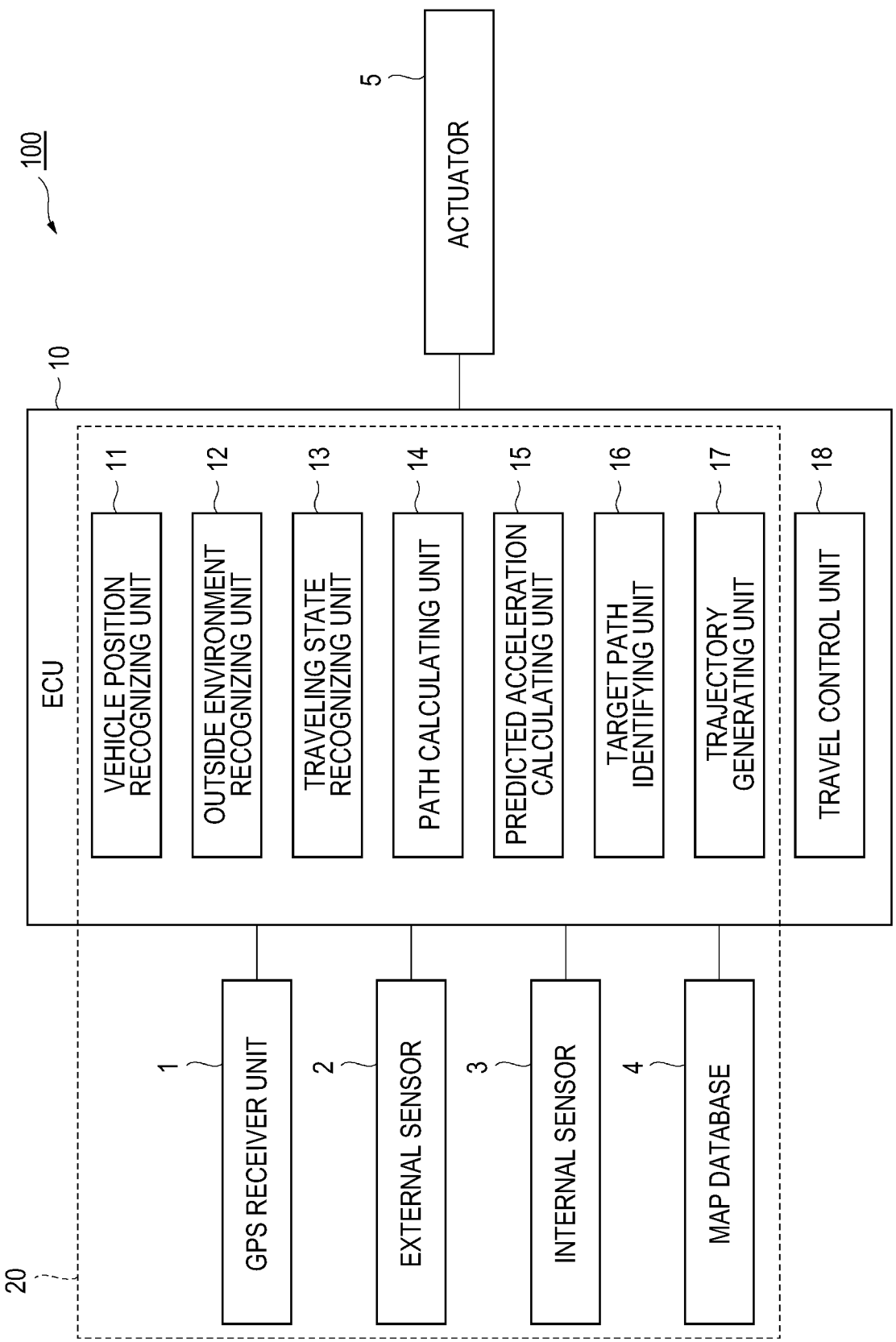
FIG. 1 is a block diagram illustrating an automated driving device including an automated driving trajectory generating device according to a first embodiment.

An automated driving trajectory generating device 20 according to a first embodiment illustrated in FIG. 1 is a device that is mounted in a vehicle and generates a trajectory for automated driving of a vehicle. The automated driving trajectory generating device 20 constitutes a part of an automated driving device 100 that automatically drives a vehicle along the generated trajectory. The trajectory for automated driving of a vehicle includes a path along which the vehicle travels and a speed of the vehicle. Here, a trajectory along which the vehicle travels for several seconds to several minutes in a situation in which a mobile object other than the vehicle is located near the vehicle on a road on which the vehicle (the host vehicle) travels is supposed as the trajectory for automated driving. The mobile object refers to a dynamic obstacle which is located near the vehicle. Examples of the mobile object include another vehicle, a bicycle, and a pedestrian. Here, the mobile object is, for example, another vehicle. Examples of the other vehicle include various types of vehicles such as a passenger car, a truck, a bus, a motorbike, and a bicycle.

Automated driving is, for example, a driving state in which a vehicle is automated to travel along a road on which the vehicle travels. The automated driving includes, for example, a driving state in which a vehicle is automated to travel to a preset destination without causing a driver to perform a driving operation. The automated driving includes automated driving levels 2 to 4 in those of the Society of Automotive Engineers (SAE) J3016.

The configurations of the automated driving trajectory generating device 20 and the automated driving device 100 according to the first embodiment will be described below with reference to the drawings. As illustrated in FIG. 1, the automated driving trajectory generating device 20 includes an electronic control unit (ECU) 10 that comprehensively manages a system. The ECU 10 is an electronic control unit including a central processing unit (CPU), a read only memory (ROM), a random access memory (RAM), and a controller area network (CAN) communication circuit. The ECU 10 realizes various functions, for example, by loading a program stored in the ROM to the RAM and causing the CPU to execute the program loaded to the RAM. The ECU 10 may include a plurality of electronic control units.

The ECU 10 is connected to a GPS receiver unit 1, an external sensor 2, an internal sensor 3, and a map database 4.

The GPS receiver unit 1 measures a position of a vehicle (for example, latitude and longitude of the vehicle) by receiving signals from three or more GPS satellites. The GPS receiver unit 1 transmits the measured position information of the vehicle to the ECU 10.

The external sensor 2 is a detection device that detects circumstances near the vehicle. The external sensor 2 includes at least one of a camera and a radar sensor. The external sensor 2 may be configured to reconstruct all properties of an outside environment in which the vehicle is traveling (a position of the vehicle, a relative distance to a mobile object, a relative speed to a mobile object, a direction of a mobile object, a shape of a lane, a lighting state of a traffic signal, and the like).

The camera is an imaging device that images outside circumstances of the vehicle. The camera is provided on the back of a front windshield of the vehicle. The camera transmits imaging information on the outside circumstances of the vehicle to the ECU 10. The camera may be a monocular camera or a stereo camera. A stereo camera includes two imaging units that are provided to reproduce binocular disparity. The imaging information from the stereo camera also includes information in a depth direction.

The radar sensor is a detection device that detects a mobile object near the vehicle using radio waves (for example, millimeter waves) or light. The radar sensor includes, for example, millimeter wave radar or Light Detection and Ranging (LiDAR). The radar sensor transmits radio waves or light to the surroundings of the vehicle and detects a mobile object and a stationary object by receiving radio waves or light reflected from the objects. The radar sensor transmits the detected mobile object information to the ECU 10. Examples of the stationary object include a utility pole, a building, and a traffic sign. Examples of the stationary object may include a white line.

The internal sensor 3 is a detection device that detects a traveling state of the vehicle. The internal sensor 3 includes a vehicle speed sensor, an acceleration sensor, and a yaw rate sensor. The vehicle speed sensor is a detector that detects a speed of the vehicle. For example, a wheel speed sensor that is provided in a wheel of the vehicle, a drive shaft rotating together with the wheel, or the like and detects a rotation speed of a corresponding wheel is used as the vehicle speed sensor. The vehicle speed sensor transmits the detected vehicle speed information (wheel speed information) to the ECU 10.

The acceleration sensor is a detector that detects an acceleration of the vehicle. The acceleration sensor includes, for example, a longitudinal acceleration sensor that detects a longitudinal acceleration of the vehicle and a lateral acceleration sensor that detects a lateral acceleration of the vehicle. The acceleration sensor transmits, for example, acceleration information of the vehicle to the ECU 10. The yaw rate sensor is a detector that detects a yaw rate (a rotational angular velocity) around a vertical axis of the center of gravity of the vehicle. For example, a gyro sensor can be used as the yaw rate sensor. The yaw rate sensor transmits the detected yaw rate information of the vehicle to the ECU 10.

The map database 4 is a database that stores map information. The map database 4 is formed, for example, in a storage medium such as a hard disk drive (HDD) mounted in the vehicle. The map information includes position information of a road, shape information of a road (for example, a curve, a type of a straight part, a radius of curvature of a curve, a shape of a crossroads, and a lane width), position information of a crossing and a branching point, and position information of a structure. For example, a shape of a straight line or a curved line connecting points (for example, nodes) parallel to the center of a lane can be used as the shape information of the road. Examples of the structure include facilities such as stores provided along a road. The map information includes setting information such as a speed limit (for example, a legal speed limit) corresponding to a position of a lane on a map. The speed limit may be an arbitrary speed equal to or lower than a legal speed limit. The map information may include various types of traffic regulation information (such as information on a section in which lane change is possible or a section in which lane change is not possible) associated with a position of a lane on a map. The map database 4 may be provided in a computer in a facility such as a management center which can communicate with the vehicle.

The actuator 5 is a device that is used for automated driving control of the vehicle. The actuator 5 includes at least a drive actuator, a brake actuator, and a steering actuator. The drive actuator controls an amount of air (a throttle opening level) supplied to an engine in accordance with a control signal from the ECU 10 and controls a driving force of the vehicle. When the vehicle is a hybrid vehicle, a control signal from the ECU 10 in addition to the amount of air supplied to the engine is input to a motor which is a power source and the driving force is controlled. When the vehicle is an electric vehicle, a control signal from the ECU 10 is input to a motor which is a power source and the driving force is controlled. The motor serving as a power source in this case constitutes the actuator 5.

The brake actuator controls a brake system in accordance with a control signal from the ECU 10 and controls a brake force which is applied to wheels of the vehicle. For example, a hydraulic brake system can be used as the brake system. The steering actuator controls drive of an assist motor that controls a steering torque in an electric power steering system in accordance with a control signal from the ECU 10. Accordingly, the steering actuator controls a steering torque of the ECU 10.

The functional configuration of the ECU 10 will be described below. The ECU 10 includes a vehicle position recognizing unit 11, an outside environment recognizing unit (a mobile object recognizing unit) 12, a traveling state recognizing unit 13, a path calculating unit 14, a predicted acceleration calculating unit 15, a target path identifying unit 16, a trajectory generating unit 17, and a travel control unit 18. The automated driving trajectory generating device 20 includes at least the outside environment recognizing unit 12, the path calculating unit 14, the predicted acceleration calculating unit 15, the target path identifying unit 16, and the trajectory generating unit 17.

The vehicle position recognizing unit 11 recognizes a position of the vehicle on a map based on the position information from the GPS receiver unit 1 and the map information of the map database 4. The vehicle position recognizing unit 11 recognizes a position of the vehicle using a simultaneous localization and mapping (SLAM) technique based on position information of a stationary object such as a utility pole included in the map information of the map database 4 and a result of detection from the external sensor 2. The vehicle position recognizing unit 11 may recognize the position of the vehicle on a map using other known methods.

The outside environment recognizing unit 12 recognizes an outside environment of the vehicle based on a result of detection from the external sensor 2. The outside environment recognizing unit 12 recognizes the outside environment of the vehicle using a known method based on imaging information from the camera and mobile object information from the radar sensor.

The outside environment recognizing unit 12 recognizes a mobile object located near the vehicle based on the result of detection from the external sensor 2. The outside environment includes a position of a mobile object relative to the vehicle, a speed of a mobile object relative to the vehicle, and a moving direction of a mobile object relative to the vehicle. The outside environment recognizing unit 12 recognizes a vehicle speed of a mobile object based on the vehicle speed of the vehicle and the relative speed of the mobile object. The outside environment recognizing unit 12 recognizes a position of a mobile object on a map based on the position of the mobile object relative to the vehicle and the map information. The outside environment recognizing unit 12 may assign a mobile object identification number to a mobile object signal indicating a mobile object for each mobile object.

The traveling state recognizing unit 13 recognizes a traveling state of the vehicle based on the result of detection from the internal sensor 3. The traveling state includes the vehicle speed of the vehicle, the acceleration of the vehicle, and the yaw rate of the vehicle. Specifically, the traveling state recognizing unit 13 recognizes the vehicle speed of the vehicle based on the vehicle speed information from the vehicle speed sensor. The traveling state recognizing unit 13 recognizes the acceleration (the longitudinal acceleration and the lateral acceleration) of the vehicle based on the acceleration information from the acceleration sensor. The traveling state recognizing unit 13 recognizes the yaw rate of the vehicle based on the yaw rate information from the yaw rate sensor.

The path calculating unit 14 calculates a host vehicle path for automated driving of the vehicle and a plurality of predicted paths of a mobile object based on the position of the vehicle on the map, a position of the mobile object on the map, and the map information. The host vehicle path for automated driving of the vehicle is a path of the vehicle along which the vehicle is automated to travel along a target route of the vehicle. A predicted path of a mobile object is a path along which the mobile object may move from a current position of the mobile object. The predicted path may be, for example, a path in a range in which the mobile object will move for several seconds to several minutes. The path calculating unit 14 may calculate the host vehicle path and the predicted paths after a preset time (for example, after one second or after three seconds).

For example, the path calculating unit 14 calculates a risk potential field of the vehicle based on information from the GPS receiver unit 1, the external sensor 2, the internal sensor 3, and the map database 4 and the target route. The path calculating unit 14 may calculate the host vehicle path by performing valley search on the risk potential field using a known method.

For example, the path calculating unit 14 calculates the risk potential field of the vehicle using a known method based on the vehicle speed of the vehicle, the position of the vehicle, a road width of a road on which the vehicle travels, and positions of one or more objects. Examples of the object include a stationary obstacle and a mobile obstacle which are detected in front of the vehicle. Examples of the stationary obstacle include road surface painting (including a lane boundary line such as a white line or a yellow line) and a structure (such as a curbstone, a pole, a utility pole, a building, a sign, or a tree). Examples of the mobile obstacle include a pedestrian, a bicycle, a baby carriage, and another vehicle.

The path calculating unit 14 calculates a predicted path of a mobile object, for example, based on the map information and the outside environment. The predicted path of a mobile object may include a plurality of paths based on a road environment around the mobile object. The path calculating unit 14 calculates, for example, one or more paths along which a mobile object may move from the current position thereof as a predicted path based on a shape of a crossing in the front of a road on which the mobile object travels or using a parking lot of a facility of a store located near the mobile object as a destination.

Figure 2A:
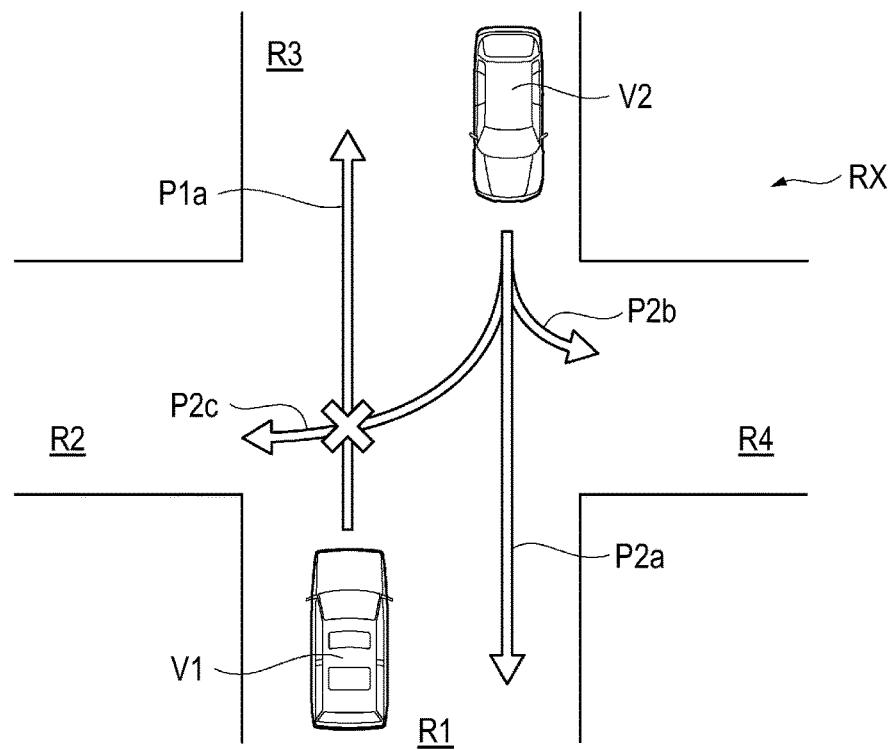
FIG. 2A is a plan view schematically illustrating a predicted path of an oncoming vehicle at a crossroads.
Figure 2B:
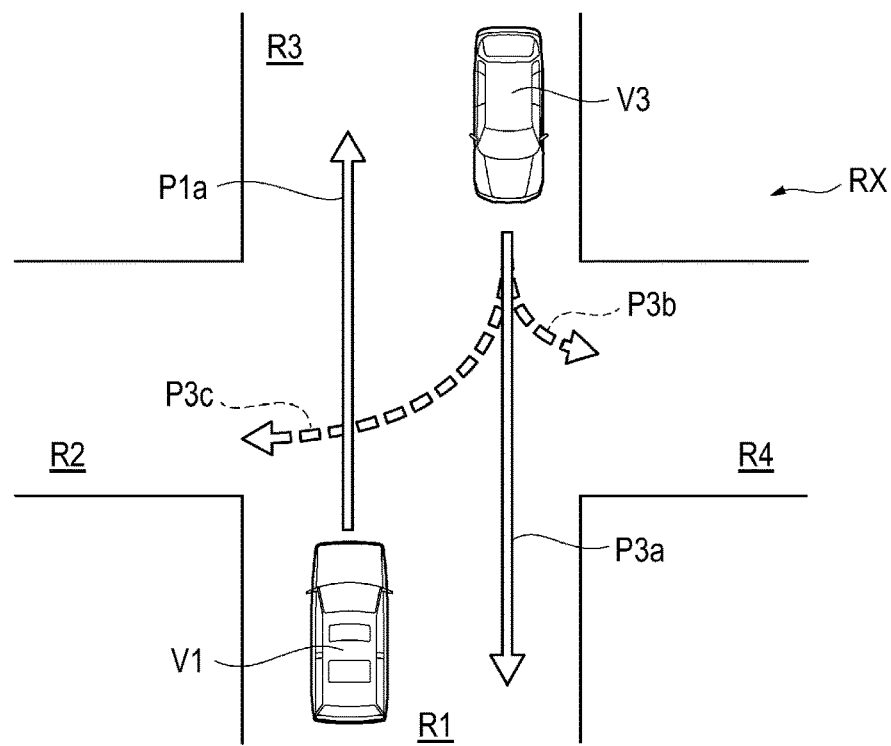
FIG. 2B is a plan view schematically illustrating a predicted path of an oncoming vehicle which is traveling at a higher speed than that of the oncoming vehicle illustrated in FIG. 2A at a crossroads.

FIG. 2A is a plan view schematically illustrating a predicted path of an oncoming vehicle at a crossroads. FIG. 2B is a plan view schematically illustrating a predicted path of an oncoming vehicle which is traveling at a higher speed than that of the oncoming vehicle illustrated in FIG. 2A at a crossroads. In FIG. 2A, another vehicle V2 which is an oncoming vehicle for a host vehicle V1 is illustrated as an example of a mobile object. In FIG. 2B, another vehicle V3 is illustrated as the oncoming vehicle which is traveling at a higher speed than that of the oncoming vehicle illustrated in FIG. 2A.

As illustrated in FIGS. 2A and 2B, the host vehicle V1, the other vehicle V2, and the other vehicle V3 are approaching as a crossroads RX. In the examples illustrated in FIGS. 2A and 2B, the path calculating unit 14 calculates a host vehicle path P1a as a host vehicle path for automated driving of the host vehicle V1 based on the position of the host vehicle V1 on the map and the map information. The host vehicle path P1a is a straight path of the host vehicle V1 from a road R1 to a road R3.

In the example illustrated in FIG. 2A, the path calculating unit 14 calculates a predicted path P2a, a predicted path P2b, and a predicted path P2c as a predicted path of the other vehicle V2. The predicted path P2a is a straight path of the other vehicle V2 from the road R3 to the road R1. The predicted path P2b is a left-turn path of the other vehicle V2 from the road R3 to a road R4. The predicted path P2c is a right-turn path of the other vehicle V2 from the road R3 to the road R2.

In the example illustrated in FIG. 2B, the path calculating unit 14 calculates a predicted path P3a, a predicted path P3b, and a predicted path P3c as a predicted path of the other vehicle V3. The predicted path P3a is a straight path of the other vehicle V3 from the road R3 to the road R1. The predicted path P3b is a left-turn path of the other vehicle V3 from the road R3 to a road R4. The predicted path P3c is a right-turn path of the other vehicle V3 from the road R3 to the road R2.

Here, a predicted path of a mobile object includes a path of which the feasibility is physically low due to behavior such as a vehicle speed of the mobile object and a path in which the mobile object cannot travel in accordance with traffic regulations to be observed. These paths are not identified as a target path as will be described later and thus are not used to generate a trajectory for a vehicle. In the examples illustrated in FIGS. 2A and 2B, the other vehicle V3 is traveling at a higher speed than the other vehicle V2. The vehicle speed of the other vehicle V2 is a vehicle speed at which the other vehicle V2 can travel along the predicted paths P2b and P2c. However, the vehicle speed of the other vehicle V3 is so high that the other vehicle V3 would have actual difficulty in traveling along the predicted paths P3b and P3c. Accordingly, the predicted paths P3b and P3c are paths of which the feasibility is low.

The predicted acceleration calculating unit 15 calculates a predicted acceleration which is generated in a mobile object moving along a predicted path based on a plurality of predicted paths and the vehicle speed of the mobile object for each predicted path. The predicted acceleration is an acceleration which is predicted to be generated in the mobile object when the mobile object moves along a predicted path. The predicted acceleration changes according to the vehicle speed of the mobile object.

The predicted acceleration calculating unit 15 may recognize a type of a mobile object (for example, a passenger car, a truck, a bus, a motorbike, a bicycle, or a pedestrian) and calculate a predicted acceleration from a motion model which is prepared for each type of a mobile object. The predicted acceleration calculating unit 15 may calculate a predicted acceleration of a mobile object by employing various known techniques associated with behavior prediction of a vehicle and a pedestrian. The predicted acceleration calculating unit 15 may restrict a mobile object to be predicted to a mobile object on a road. In this case, the predicted acceleration calculating unit 15 may perform a behavior prediction operation on the assumption that a mobile object is a vehicle.

A predicted acceleration can include a predicted lateral acceleration and a predicted longitudinal acceleration. The predicted lateral acceleration is an acceleration in a lateral direction which is predicted to be generated in a mobile object when the mobile object moves along a curved predicted path. The lateral direction is a vehicle width direction of the mobile object.

Here, the predicted acceleration calculating unit 15 calculates the predicted lateral acceleration as the predicted acceleration. The predicted acceleration calculating unit 15 calculates a predicted lateral acceleration which is generated in a mobile object moving along a predicted path for each predicted path based on a radius of curvature of the predicted path and the vehicle speed of the mobile object. In the example illustrated in FIG. 2A, the predicted acceleration calculating unit 15 calculates a centrifugal force generated in the other vehicle V2 as the predicted lateral acceleration based on the radius of curvature of the predicted path in a curved section of the predicted paths P2b and P2c and the vehicle speed of the other vehicle V2. In the example illustrated in FIG. 2B, the predicted acceleration calculating unit 15 calculates a centrifugal force generated in the other vehicle V3 as the predicted lateral acceleration based on the radius of curvature of the predicted path in a curved section of the predicted paths P3b and P3c and the vehicle speed of the other vehicle V3.

The target path identifying unit 16 identifies a target path based on a result of comparison between the predicted acceleration and an acceleration threshold value. The target path is a predicted path which is used to generate a trajectory out of a plurality of predicted paths. Here, the target path identifying unit 16 identifies a predicted path in which a maximum value of the predicted lateral acceleration is less than a lateral acceleration threshold value out of a plurality of predicted paths as the target path.

The lateral acceleration threshold value is a threshold value for a predicted lateral acceleration for determining whether a predicted path of a mobile object is a path of which the feasibility is physically low. The lateral acceleration threshold value may be a preset parameter or map or the like. The lateral acceleration threshold value may be set based on a radius of curvature of the predicted path. For example, the lateral acceleration threshold value can be set to increase as the radius of curvature of the predicted path decreases. The lateral acceleration threshold value may be set based on the type of the mobile object.

Specifically, the target path identifying unit 16 may determine whether a maximum value of a predicted lateral acceleration is less than the lateral acceleration threshold value. When it is determined that the maximum value of the predicted lateral acceleration is less than the lateral acceleration threshold value, the target path identifying unit 16 identifies the predicted path as a target path. When it is determined that the maximum value of the predicted lateral acceleration is equal to or greater than the lateral acceleration threshold value, the target path identifying unit 16 does not identify the predicted path as a target path. "Not identify as a target path" includes, for example, a case in which a path is not substantially identified as a target path due to its low probability value when a plurality of paths is evaluated using probability values based on the risk potential field.

In the example illustrated in FIG. 2A, the target path identifying unit 16 determines that the maximum value of the predicted lateral accelerations of the predicted paths P2a, P2b, and P2c is less than the lateral acceleration threshold value. The target path identifying unit 16 identifies the predicted paths P2a, P2b, and P2c as target paths.

In the example illustrated in FIG. 2B, the target path identifying unit 16 determines that the maximum value of the predicted lateral acceleration for the predicted path P3a is less than the lateral acceleration threshold value and determines that the maximum value of the predicted lateral accelerations for the predicted paths P3b and P3c is equal to or greater than the lateral acceleration threshold value. The target path identifying unit 16 identifies the predicted path P3a as a target path. On the other hand, the target path identifying unit 16 does not identify the predicted paths P3b and P3c as target paths.

The trajectory generating unit 17 generates a trajectory based on the host vehicle path and the target path. The trajectory generating unit 17 generates a trajectory, for example, such that the vehicle and the mobile object do not collide with each other.

For example, the trajectory generating unit 17 determines whether the host vehicle path interferes with the target path. When it is determined that the host vehicle path and the target path interfere with each other, the trajectory generating unit 17 generates a first trajectory for interference avoidance (an avoidance interference trajectory). The first trajectory is a trajectory in which the vehicle and the mobile object do not collide with each other. The first trajectory may be, for example, a trajectory in which the vehicle stops before an interference position. When the host vehicle path and the target path interfere with each other, the trajectory generating unit 17 calculates an interference position between the host vehicle path and the target path. The trajectory generating unit 17 generates the first trajectory based on the vehicle speed of the vehicle and the interference position with respect to the host vehicle path. For example, the trajectory generating unit 17 generates the first trajectory with a speed plan for causing the vehicle traveling along the host vehicle path to decelerate and stop before the interference position.

When it is determined that the host vehicle path and the target path do not interfere with each other, the trajectory generating unit 17 generates a second trajectory. The second trajectory is a trajectory for the vehicle which does not accompany an operation of avoiding the mobile object. The second trajectory may be, for example, a trajectory in which the vehicle is caused to travel along the host vehicle path.

The travel control unit 18 causes the vehicle to travel autonomously along the trajectory generated by the trajectory generating unit 17. The travel control unit 18 controls the actuator 5 such that the vehicle travels along the trajectory generated by the trajectory generating unit 17. For example, when it is determined that the host vehicle path and the target path interfere with each other, the travel control unit 18 performs control such that the vehicle travels along the first trajectory and stops at the interference position. When it is determined that the host vehicle path and the target path do not interfere with each other, the travel control unit 18 performs control such that the vehicle travels along the second trajectory, and causes the vehicle to travel along the host vehicle path.

In the example illustrated in FIG. 2A, out of the predicted paths P2a, P2b, and P2c identified as the target paths, the predicted path P2c interferes with the host vehicle path P1a. Accordingly, the ECU 10 determines that the host vehicle path and the target path interfere with each other. The trajectory generating unit 17 acquires coordinates on a map of a position at which the host vehicle path P1a and the predicted path P2c cross each other as the interference position. The trajectory generating unit 17 acquires an interference time based on the interference position between the host vehicle path P1a and the predicted path P2c, the position of the host vehicle V1 on the map, and the vehicle speed of the host vehicle V1. The trajectory generating unit 17 generates the first trajectory with a speed plan for causing the host vehicle V1 traveling along the host vehicle path P1a to decelerate and to stop before the interference position. The travel control unit 18 controls the actuator 5 such that the host vehicle V1 travels along the first trajectory and stops before the interference position.

In the example illustrated in FIG. 2B, the predicted path P3a identified as the target path does not interfere with the host vehicle path P1a, and the predicted paths P3b and P3c are not identified as the target paths. Accordingly, the ECU 10 determines that the host vehicle path and the target path do not interfere with each other. The trajectory generating unit 17 generates the second trajectory based on the host vehicle path P1a. The travel control unit 18 controls the actuator 5 such that the host vehicle V1 travels along the second trajectory based on the host vehicle path P1a.

A routine which is performed by the ECU 10 of the automated driving trajectory generating device 20 and the automated driving device 100 will be described below with reference to the drawings.

A routine which is performed by the ECU 10 will be described below with reference to FIG. 3. FIG. 3 is a flowchart illustrating an example of an automated driving process of the ECU 10 illustrated in FIG. 1. The flowchart illustrated in FIG. 3 is performed, for example, in automated driving.

As illustrated in FIG. 3, the ECU 10 of the automated driving trajectory generating device 20 and the automated driving device 100 recognizes the position of the vehicle on the map using the vehicle position recognizing unit 11 in S01. The vehicle position recognizing unit 11 recognizes the position of the vehicle on the map based on the position information from the GPS receiver unit 1 and the map information of the map database 4.

In S02, the ECU 10 recognizes a traveling state of the vehicle using the traveling state recognizing unit 13. The traveling state recognizing unit 13 recognizes at least the vehicle speed of the vehicle as the traveling state of the vehicle which is traveling based on a result of detection from the internal sensor 3.

In S03, the ECU 10 recognizes a mobile object using the outside environment recognizing unit 12. The outside environment recognizing unit 12 recognizes the outside environment of the vehicle and recognizes a mobile object based on a result of detection from the external sensor 2. The outside environment recognizing unit 12 recognizes, for example, a position of a mobile object relative to the vehicle, a speed of the mobile object relative to the vehicle and a moving direction of the mobile object with respect to the vehicle as the outside environment. The outside environment recognizing unit 12 recognizes a vehicle speed of the mobile object based on the vehicle speed of the vehicle and the relative speed of the mobile object. The outside environment recognizing unit 12 recognizes the position of the mobile object on the map based on the position of the mobile object relative to the vehicle and the map information.

In S04, the ECU 10 calculates a plurality of predicted paths of the mobile object using the path calculating unit 14. The path calculating unit 14 calculates the plurality of predicted paths of the mobile object based on the position of the mobile object on the map and the map information. In the example illustrated in FIG. 2A, the path calculating unit 14 calculates the predicted paths P2a, P2b, and P2c as the plurality of predicted paths.

In S05, the ECU 10 calculates a predicted acceleration for each predicted path using the predicted acceleration calculating unit 15. The predicted acceleration calculating unit 15 calculates a predicted acceleration generated in the mobile object moving along a predicted path for each predicted path based on the plurality of predicted paths and the vehicle speed of the mobile object. In S06, the ECU 10 identifies a target path using the target path identifying unit 16. The target path identifying unit 16 identifies the target path based on a result of comparison between the predicted acceleration and the acceleration threshold value. In S05 and S06, specifically, the ECU 10 performs a routine which is illustrated in FIG. 4.

FIG. 4 is a flowchart illustrating an example of the processes of S05 and S06 in FIG. 3. The flowchart illustrated in FIG. 4 is performed, for example, while the ECU illustrated in FIG. 1 is performing its processing in automated driving. The routine illustrated in FIG. 4 may be repeatedly performed for each predicted path when there is a plurality of predicted paths.

As illustrated in FIG. 4, the ECU 10 performs the process of S11 as the process of S05 for each predicted path. In S11, the ECU 10 calculates a predicted lateral acceleration for each predicted path based on a radius of curvature of a predicted path and the vehicle speed of the mobile object using the predicted acceleration calculating unit 15. For example, the predicted acceleration calculating unit 15 calculates a centrifugal force which is generated in the mobile object based on the radius of curvature of a predicted path and the vehicle speed of the mobile object in curved sections of the predicted paths P2b and P2c as the predicted lateral acceleration.

The ECU 10 performs the processes of S12 to S14 for each predicted path as the process of S06. In S12, the ECU 10 determines whether the maximum value of the predicted lateral acceleration is less than the lateral acceleration threshold value using the target path identifying unit 16. When it is determined that the maximum value of the predicted lateral acceleration is less than the lateral acceleration threshold value (S12: YES), the ECU 10 performs the process of S13. When it is determined that the maximum value of the predicted lateral acceleration is equal to or greater than the lateral acceleration threshold value (S12: NO), the ECU 10 performs the process of S14.

In S13, the ECU 10 identifies the predicted path as a target path using the target path identifying unit 16. On the other hand, in S14, the ECU 10 does not identify the predicted path as a target path using the target path identifying unit 16.

After the process of S13 or S14 has been performed, the ECU 10 ends the routine illustrated in FIG. 4 and performs the process of S07 in FIG. 3.

In S07, the ECU 10 calculates the host vehicle path of the vehicle using the path calculating unit 14. The path calculating unit 14 calculates the host vehicle path for automated driving of the vehicle based on the position of the vehicle on the map and the map information. In the examples illustrated in FIGS. 2A and 2B, the path calculating unit 14 calculates a host vehicle path P1a as the host vehicle path.

In S08, the ECU 10 generates the trajectory for automated driving of the vehicle using the trajectory generating unit 17. The trajectory generating unit 17 generates the trajectory based on the host vehicle path and the target path. In S09, the ECU 10 controls travel of the vehicle using the travel control unit 18. The travel control unit 18 controls the actuator 5 such that the vehicle travels along the trajectory generated by the trajectory generating unit 17. In S08 and S09, specifically, the ECU 10 performs the routine illustrated in FIG. 5.

FIG. 5 is a flowchart illustrating an example of the processes of S08 and S09 illustrated in FIG. 3. The flowchart illustrated in FIG. 5 is performed, for example, while the ECU illustrated in FIG. 1 is performing its processing in automated driving.

As illustrated in FIG. 5, in S21, the ECU 10 determines whether the host vehicle path and the target path interfere with each other using the trajectory generating unit 17. When it is determined that the host vehicle path and the target path interfere with each other (S21: YES), the ECU 10 performs the process of S22. When it is determined that the host vehicle path and the target path do not interfere with each other (S21: NO), the ECU 10 performs the process of S25. In S21, for example, when a plurality of target paths is identified and at least one target path interferes with the host vehicle path, the ECU 10 may determine that the host vehicle path and the target path interfere with each other.

In S22, the ECU 10 acquires an interference position and an interference time using the trajectory generating unit 17. In S23, the ECU 10 generates a first trajectory for interference avoidance of the vehicle using the trajectory generating unit 17. In S24, the ECU 10 controls travel of the vehicle along the first trajectory and causes the vehicle to stop before the interference position using the travel control unit 18. After the process of S24 has been performed, the ECU 10 ends the routine illustrated in FIG. 5, performs the routine illustrated in FIG. 3, and ends the routine illustrated in FIG. 3.

On the other hand, in S25, the ECU 10 generates a second trajectory along the host vehicle path P1a using the trajectory generating unit 17. In S26, the ECU 10 controls travel of the vehicle along the second trajectory and causes the vehicle to travel along the host vehicle path P1a using the travel control unit 18. After the process of S26 has been performed, the ECU 10 ends the routine illustrated in FIG. 5, performs the routine illustrated in FIG. 3, and ends the routine illustrated in FIG. 3.

As described above, with the automated driving trajectory generating device 20 according to the first embodiment, a predicted acceleration of a mobile object is calculated for each predicted path based on a plurality of predicted paths and a vehicle speed of the mobile object. A target path which is a predicted path used to generate a trajectory out of the predicted paths is identified based on a result of comparison between the predicted acceleration and the acceleration threshold value. A trajectory is generated based on the host vehicle path and the target path. In this way, it is possible to generate a trajectory in consideration of the feasibility of the predicted paths of the mobile object by using the target path identified based on the result of comparison between the predicted acceleration and the acceleration threshold value. Accordingly, it is possible to more appropriately generate a trajectory for automated driving in comparison with a case in which the feasibility of the predicted paths of the mobile object is not considered.

In the automated driving trajectory generating device 20, the predicted acceleration calculating unit 15 calculates a predicted lateral acceleration which is generated in a mobile object moving along a predicted path for each predicted path based on a radius of curvature of the corresponding predicted path and the vehicle speed of the mobile object. The target path identifying unit 16 identifies a predicted path in which the maximum value of the predicted lateral acceleration is less than the lateral acceleration threshold value out of a plurality of predicted paths as a target path. Accordingly, it is possible to more appropriately generate a trajectory for automated driving based on the knowledge that the feasibility of a predicted path in which the maximum value of the predicted lateral acceleration generated in a mobile object is equal to or greater than the lateral acceleration threshold value is low.

With the automated driving device 100 according to the first embodiment, a predicted acceleration of a mobile object is calculated for each predicted path based on a plurality of predicted paths and the vehicle speed of the mobile object. A target path which is a predicted path used to generate a trajectory out of the predicted paths is identified based on a result of comparison between the predicted acceleration and the acceleration threshold value. A trajectory is generated based on the host vehicle path and the target path. In this way, it is possible to generate a trajectory in consideration of the feasibility of the predicted paths of the mobile object using the target path identified based on the result of comparison between the predicted acceleration and the acceleration threshold value. Accordingly, it is possible to more appropriately generate a trajectory for automated driving in comparison with a case in which the feasibility of the predicted paths of the mobile object is not considered. With the automated driving device 100, when the host vehicle path and the target path interfere with each other, the first trajectory for interference avoidance (an interference avoidance trajectory) is generated and the vehicle is decelerated along the first trajectory. Accordingly, the vehicle is stopped before the interference position. In this way, since the vehicle is decelerated in consideration of the feasibility of the predicted paths of the mobile object, it is possible to more appropriately decelerate the vehicle in comparison with a case in which the feasibility of the predicted paths of the mobile object is not considered.

Sudden deceleration is needed for the vehicle in order to avoid collision with a mobile object on a predicted path interfering with the host vehicle path, but a predicted path along which the mobile cannot actually travel is not identified as a target path. Accordingly, since a trajectory of the vehicle associated with a predicted path which interferes with the host vehicle path and of which the feasibility is insufficient is not generated, the vehicle does not have to perform unnecessary sudden deceleration. Accordingly, it is possible to prevent a decrease in travel efficiency or a decrease in fuel efficiency of the vehicle due to unnecessary sudden deceleration.

Second Embodiment

Figure 6:
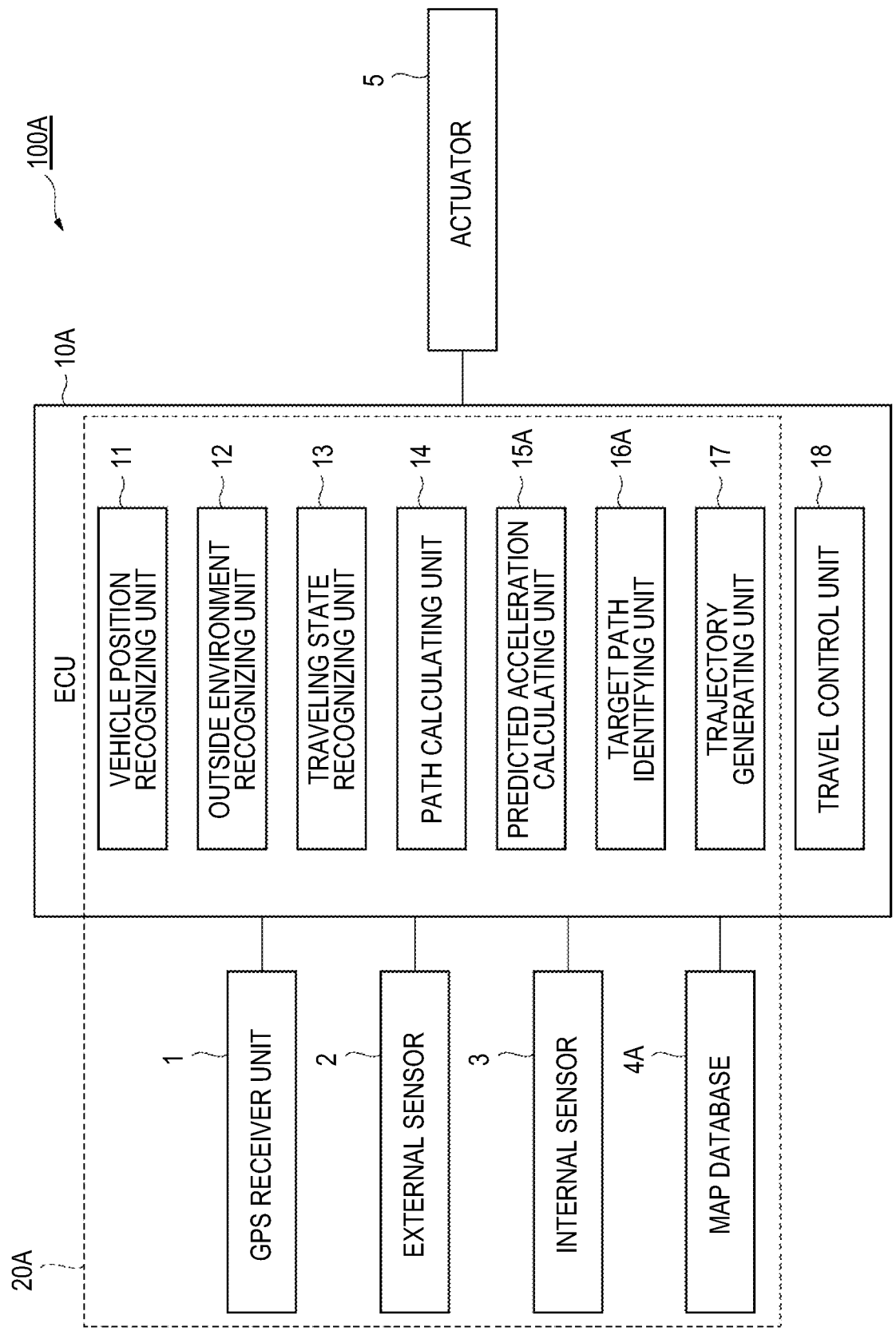
FIG. 6 is a block diagram illustrating an automated driving device including an automated driving trajectory generating device according to a second embodiment.

An automated driving trajectory generating device 20A and an automated driving device 100A according to a second embodiment will be described below with reference to the accompanying drawings. FIG. 6 is a block diagram illustrating an automated driving trajectory generating device according to the second embodiment. The automated driving trajectory generating device 20A and the automated driving device 100A illustrated in FIG. 6 are different from those according to the first embodiment, in that a predicted longitudinal acceleration is used instead of the predicted lateral acceleration as the predicted acceleration and a target path is identified in consideration of priorities under traffic regulations. The same or corresponding elements as those in the first embodiment will be referred to by the same reference signs and description thereof will be omitted.

As illustrated in FIG. 6, the automated driving trajectory generating device 20A and the automated driving device 100A according to the second embodiment include a map database 4A instead of the map database 4 and include an ECU 10A including a predicted acceleration calculating unit 15A and a target path identifying unit 16A.

The map database 4A is basically configured in the same way as the map database 4. The map database 4A additionally stores priority information for defining the priorities under traffic regulations for a plurality of vehicles on a road as map information. Examples of the priorities under traffic regulations include priorities for vehicles which are located on roads crossing each other at a crossing, priorities for vehicles which are located on roads when one road merges to another road, and priorities for vehicles which are located in neighboring lanes.

Figure 7A:
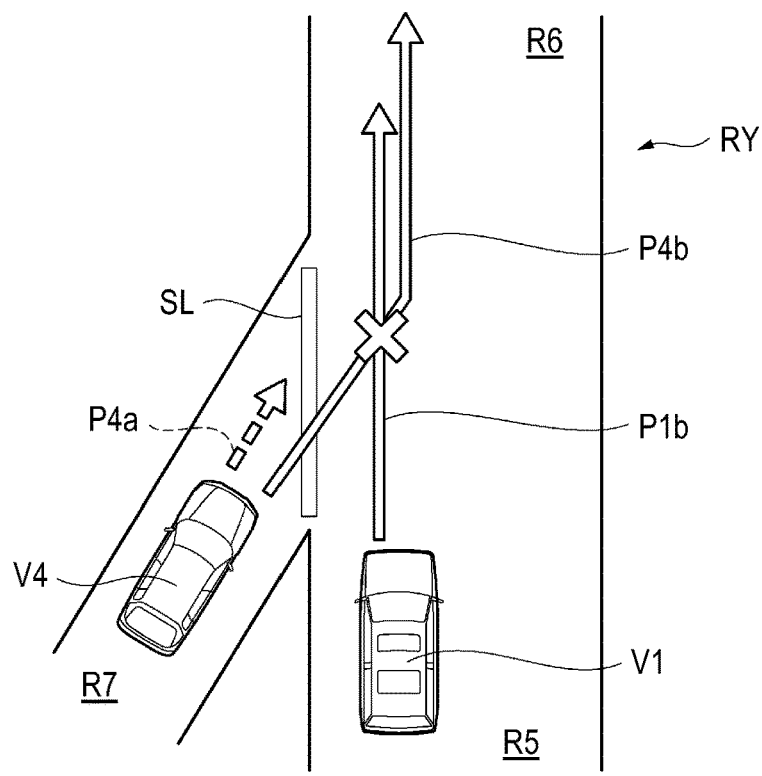
FIG. 7A is a plan view schematically illustrating a predicted path of a merging vehicle at Y-shaped roads.
Figure 7B:
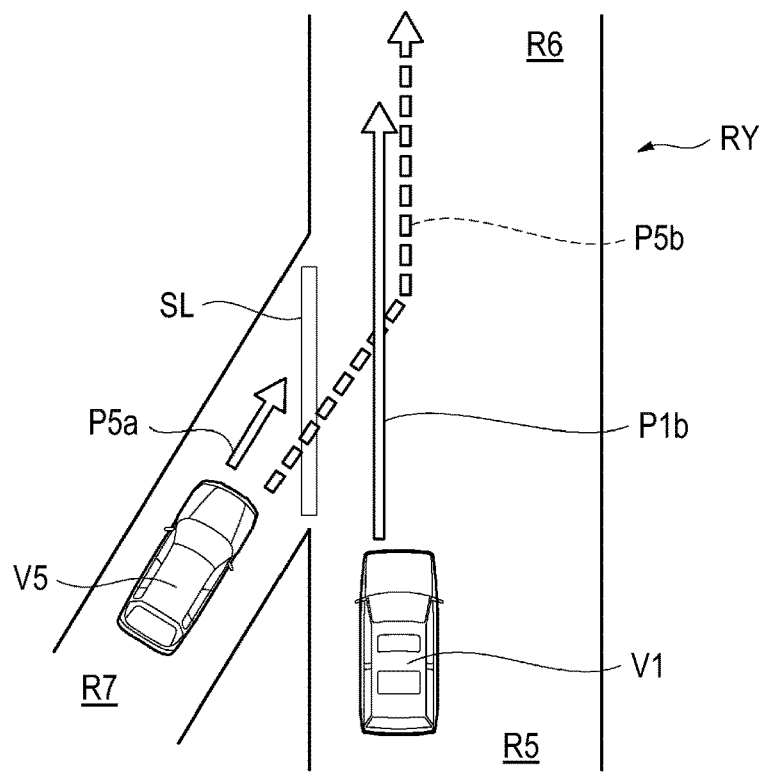
FIG. 7B is a plan view schematically illustrating a predicted path of a merging vehicle which is traveling at a lower speed than that of the merging vehicle illustrated in FIG. 7A at Y-shaped roads.

FIG. 7A is a plan view schematically illustrating a predicted path of a merging vehicle on Y-shaped roads. FIG. 7B is a plan view schematically illustrating a predicted path of a merging vehicle which travels faster than the merging vehicle illustrated in FIG. 7A on the Y-shaped roads. In FIG. 7A, another vehicle V4 which is a merging vehicle to merge to a road R5 on which the host vehicle V1 is traveling is illustrated as an example of a mobile object. In FIG. 7B, another vehicle V5 is illustrated as the merging vehicle which travels slower than the merging vehicle illustrated in FIG. 7A.

The path calculating unit 14 functions in the same way as in the first embodiment. As illustrated in FIGS. 7A and 7B, the host vehicle V1, the other vehicle V4, and the other vehicle V5 are approaching the Y-shaped roads RY. In the examples illustrated in FIGS. 7A and 7B, the path calculating unit 14 calculates a host vehicle path P1*b* as a host vehicle path for automated driving of the host vehicle V1 based on the position of the host vehicle V1 on the map and the map information. The host vehicle path P1*b* is a straight path of the host vehicle V1 from a road R5 to a road R6.

In the example illustrated in FIG. 7A, the path calculating unit 14 calculates a predicted path P4*a* and a predicted path P4*b* as the predicted paths of the other vehicle V4. The predicted path P4*a* is a merging path of the other vehicle V4 which merges to the road R6 after temporarily stopping at a stop line (a temporary stop position) SL installed on the road R7. The predicted path P4*b* is a merging path of the other vehicle V4 which merges to the road R6 without temporarily stopping at the stop line SL. In the example illustrated in FIG. 7B, the path calculating unit 14 calculates a predicted path P5*a* and a predicted path P5*b* as the predicted paths of the other vehicle V5. The predicted path P5*a* is a merging path of the other vehicle V5 which merges to the road R6 after temporarily stopping at a stop line SL installed on the road R7. The predicted path P5*b* is a merging path of the other vehicle V5 which merges to the road R6 without temporarily stopping at the stop line SL.

The predicted acceleration calculating unit 15A calculates a predicted longitudinal acceleration as a predicted acceleration. The predicted longitudinal acceleration is a longitudinal acceleration which is predicted to be generated in a mobile object when the mobile object accelerates or decelerates along a predicted path. The longitudinal direction means a traveling direction of the mobile object.

The predicted acceleration calculating unit 15A calculates a predicted longitudinal acceleration generated in a mobile object moving along a predicted path for each predicted path based on a temporary stop position or a deceleration position of the mobile object located on a predicted path and a vehicle speed of the mobile object. The temporary stop position is a position at which a mobile object is to stop temporarily in traffic regulations or socially-accepted idea. Examples of the temporary stop position include a position of a stop line, a predetermined position before a pedestrian crossing, and a position of an entrance of a facility on a roadside. The deceleration position is a position at which a mobile object is to decrease its vehicle speed in traffic regulations or socially-accepted idea. Examples of the deceleration position include a position at which a speed limit changes to a lower speed and a predetermined position before a vehicle entering a curved road from a straight road.

In the example illustrated in FIG. 7A, the predicted acceleration calculating unit 15A calculates a negative value of a predicted acceleration generated in the other vehicle V4 when the other vehicle V4 decelerates to stop at the stop line SL while traveling along the predicted path P4a as a predicted longitudinal acceleration based on the position of the stop line SL located on the predicted path P4a and the vehicle speed of the other vehicle V4. The predicted acceleration calculating unit 15A calculates a negative value of a predicted acceleration generated in the other vehicle V4 when the other vehicle V4 travels slowly while traveling along the predicted path P4b as the predicted longitudinal acceleration based on the deceleration position (for example, a position at which a vehicle moves slowly at the time of merging) located on the predicted path P4b and the vehicle speed of the other vehicle V4.

In the example illustrated in FIG. 7B, the predicted acceleration calculating unit 15A calculates a negative value of a predicted acceleration generated in the other vehicle V5 when the other vehicle V5 decelerates to stop at the stop line SL while traveling along the predicted path P5a as a predicted longitudinal acceleration based on the position of the stop line SL located on the predicted path P5a and the vehicle speed of the other vehicle V5. The predicted acceleration calculating unit 15A calculates a negative value of a predicted acceleration generated in the other vehicle V5 when the other vehicle V5 travels slowly while traveling along the predicted path P5b as a predicted longitudinal acceleration based on the deceleration position located on the predicted path P5b and the vehicle speed of the other vehicle V5.

The target path identifying unit 16A identifies a predicted path in which a maximum value of the predicted longitudinal acceleration is less than a longitudinal acceleration threshold value out of a plurality of predicted paths as a target path.

The longitudinal acceleration threshold value is a threshold value for the predicted longitudinal acceleration for determining whether a predicted path of a mobile object is a path of which the feasibility is physically low. The longitudinal acceleration threshold value may be a preset parameter or map or the like. The longitudinal acceleration threshold value may be set according to circumstances of a road in which deceleration is required. For example, the longitudinal acceleration threshold value can be set such that the threshold value becomes greater in comparison with a case in which a mobile object is to decelerate at a deceleration position when the mobile object is to stop at a temporary stop position. The longitudinal acceleration threshold value may be set according to a type of a mobile object.

Specifically, the target path identifying unit 16A may determine whether the maximum value of the predicted longitudinal acceleration is less than a longitudinal acceleration threshold value. When it is determined that the maximum value of the predicted longitudinal acceleration is less than the longitudinal acceleration threshold value, the target path identifying unit 16A identifies the predicted path as a target path. When it is determined that the maximum value of the predicted longitudinal acceleration is equal to or greater than the longitudinal acceleration threshold value, the target path identifying unit 16A does not identify the predicted path as the target path. In determination of the target path identifying unit 16A, a value with a positive or negative sign may be used as the predicted longitudinal acceleration and a threshold value with the corresponding positive or negative sign may be used as the longitudinal acceleration threshold value.

In FIGS. 7A and 7B, the other vehicles V4 and V5 have to stop temporarily at the stop line SL in accordance with traffic regulations based on a relationship between the host vehicle V1 and the other vehicles V4 and V5 which are approaching the Y-shaped roads RY. The other vehicle V5 is traveling slower than the other vehicle V4. The vehicle speed of the other vehicle V5 is a vehicle speed at which the other vehicle V5 can stop temporarily at the stop line SL. However, the vehicle speed of the other vehicle V4 is so high that the other vehicle V4 has actual difficulty stopping temporarily at the stop line SL. In this case, in FIG. 7A, the other vehicle V4 travels unavoidably along the predicted path P4b and the feasibility of the predicted path P4a is lower than the feasibility of the predicted path P4b. Therefore, the target path identifying unit 16A determines that the maximum value of the predicted longitudinal acceleration for the predicted path P4b is less than the longitudinal acceleration threshold value and determines that the maximum value of the predicted longitudinal acceleration for the predicted path P4a is equal to or greater than the longitudinal acceleration threshold value. The target path identifying unit 16A identifies the predicted path P4b as a target path. On the other hand, the target path identifying unit 16A does not identify the predicted path P4a as a target path.

The target path identifying unit 16A may additionally identify a target path in which the priority of a mobile object is equal to or higher than the priority of the vehicle out of a plurality of predicted paths. Specifically, the target path identifying unit 16A acquires the priority of the vehicle and the priority of the mobile object in a relationship between the vehicle and the mobile object as priority information based on the position of the vehicle on the map, the position of the mobile object on the map, and the map information. For example, the priority can be expressed as numerical values which are sequentially assigned from 1 to both the vehicle and the mobile object according to the priorities under traffic regulations at the crossroads which the vehicle and the mobile object are approaching.

The target path identifying unit 16A may determine whether the priority of the mobile object is equal to or higher than the priority of the vehicle. When it is determined that the priority of the mobile object is equal to or higher than the priority of the vehicle, the target path identifying unit 16A identifies the corresponding predicted path as a target path. When it is determined that the priority of the mobile object is less than the priority of the vehicle, the target path identifying unit 16A does not identify the corresponding predicted path as a target path.

In FIG. 7B, the vehicle speed of the other vehicle V5 is a vehicle speed at which the other vehicle V5 can stop temporarily at the stop line SL. Accordingly, the target path identifying unit 16A determines that the maximum value of the predicted longitudinal acceleration for the predicted paths P5a and P5b is less than the longitudinal acceleration threshold value. The target path identifying unit 16A identifies the predicted paths P5a and P5b as target paths. When the number of identified target paths (predicted paths) is equal to or greater than 2, the target path identifying unit 16A additionally identifies a target path in which the priority of the mobile object is equal to or higher than the priority of the vehicle out of a plurality of predicted paths. The target path identifying unit 16A may identify a target path using the priority information for a predicted path joining to a road on which the vehicle travels or a predicted path joining to a crossroads which the vehicle are approaching out of the identified target paths.

In the example illustrated in FIG. 7B, the priority of the host vehicle V1 is 1 and the priority of the other vehicle V5 is 2. That is, the priority of the other vehicle V5 is lower than the priority of the host vehicle V1. The target path identifying unit 16A determines that the priority of the other vehicle V5 is lower than the priority of the host vehicle V1. The target path identifying unit 16A does not identify the predicted path P5b which is a predicted path joining to the Y-shaped roads RY which the host vehicle V1 is approaching as a target path. As a result, the target path identifying unit 16A identifies the remaining predicted path P5a as a target path.

In addition, when the number of identified target paths (predicted paths) is 1, the target path identifying unit 16A may omit identification of a target path using the priority information. In the example illustrated in FIG. 7A, since the number of predicted paths decreases to 1 through the identification of a target path using the predicted longitudinal acceleration, the identification of a target path using the priority information is omitted.

A routine which is performed by the ECU 10A of the automated driving trajectory generating device 20A and the automated driving device 100A will be described below with reference to the accompanying drawings.

The routine which is performed by the ECU 10A will be described with reference to FIG. 8. FIG. 8 is a flowchart illustrating an example of an automated driving process which is performed by the ECU 10A illustrated in FIG. 6. The flowchart illustrated in FIG. 8 is performed, for example, in automated driving.

As illustrated in FIG. 8, the automated driving process of the ECU 10A is basically the same as the automated driving process of the ECU 10 illustrated in FIG. 3. The automated driving process of the ECU 10A is different from the automated driving process of the ECU 10 illustrated in FIG. 3 in S35 and S36. Accordingly, the different processes will be described below.

The ECU 10A of the automated driving trajectory generating device 20A and the automated driving device 100A calculates a predicted acceleration for each predicted path using the predicted acceleration calculating unit 15A in S35. The predicted acceleration calculating unit 15A calculates a predicted acceleration which his generated in a mobile object moving along a predicted path for each predicted path based on a plurality of predicted paths and a vehicle speed of the mobile object. In S36, the ECU 10A identifies a target path using the target path identifying unit 16A. The target path identifying unit 16A identifies a target path based on a result of comparison between the predicted acceleration and the acceleration threshold value. In S35 and S36, the ECU 10A specifically performs routines illustrated in FIGS. 9 and 10.

FIG. 9 is a flowchart illustrating an example of the processes of S35 and S36 illustrated in FIG. 8. The flowchart illustrated in FIG. 9 is performed, for example, while the ECU illustrated in FIG. 8 is performing its processing in automated driving. The routine illustrated in FIG. 8 may be repeatedly performed for each predicted path when there is a plurality of predicted paths.

As illustrated in FIG. 9, the ECU 10A performs the process of S41 for each predicted path as the process of S35. In S41, the ECU 10A calculates a predicted longitudinal acceleration for each predicted path based on a temporary stop position or a deceleration position of a mobile object located on the predicted path and the vehicle speed of the mobile object using the predicted acceleration calculating unit 15A. The predicted acceleration calculating unit 15A calculates, for example, accelerations which are generated in the other vehicles V4 and V5 due to deceleration for temporary stop at the stop line SL in the predicted paths P4a and P5a as the predicted longitudinal acceleration.

The ECU 10A performs the processes of S42 to S44 for each predicted path as the process of S36. In S42, the ECU 10A determines whether the maximum value of the predicted longitudinal acceleration is less than the longitudinal acceleration threshold value using the target path identifying unit 16A. When it is determined that the maximum value of the predicted longitudinal acceleration is less than the longitudinal acceleration threshold value (S42: YES), the ECU 10A performs the process of S43. When it is determined that the maximum value of the predicted longitudinal acceleration is equal to or greater than the longitudinal acceleration threshold value (S42: NO), the ECU 10A performs the process of S44.

In S43, the ECU 10A identifies the predicted path as a target path using the target path identifying unit 16A. On the other hand, in S44, the ECU 10A does not identify the predicted path as a target path using the target path identifying unit 16A.

The ECU 10A ends the routine illustrated in FIG. 9 after performing the process of S43 or S44. When the number of identified target paths is equal to or greater than 2, the ECU 10A performs the process of S51 illustrated in FIG. 10. When the number of identified target paths is 1, the ECU 10A skips the routine illustrated in FIG. 10 and performs the process of S37 in FIG. 8.

Figure 10:
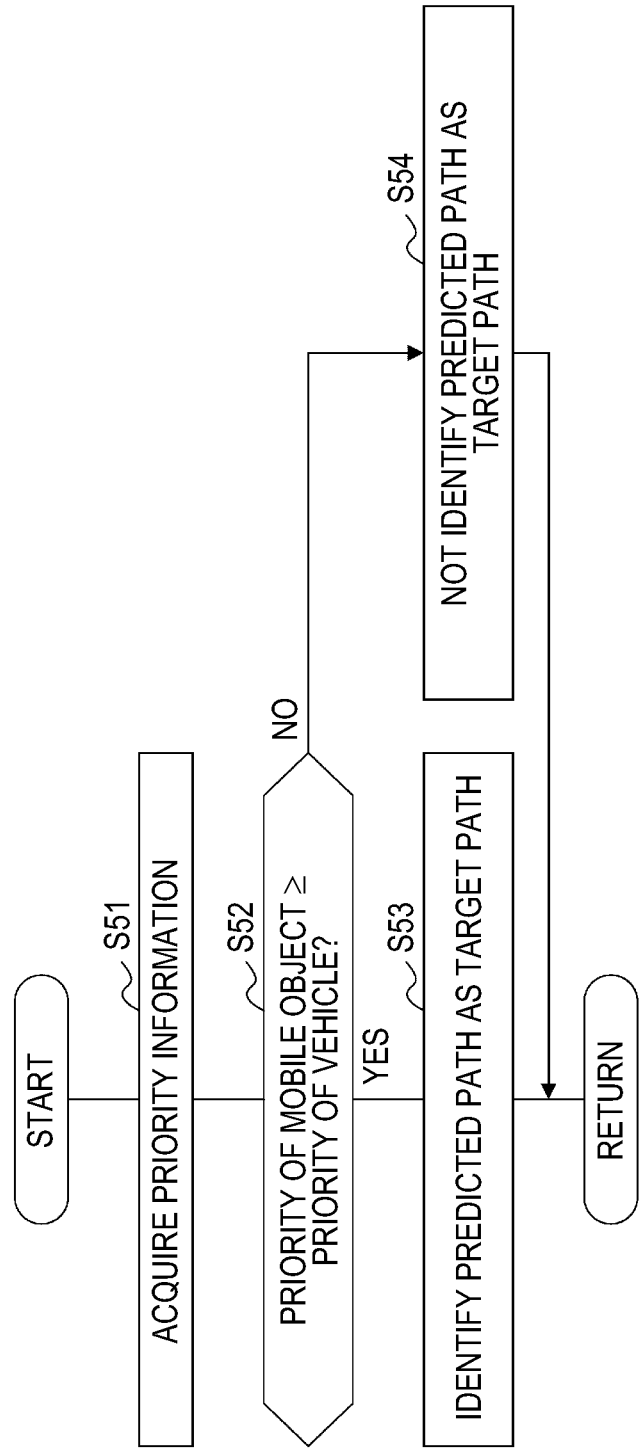
FIG. 10 is a flowchart illustrating an example of an additional target path identifying process.

FIG. 10 is a flowchart illustrating an example of an additional target path identifying process. The flowchart illustrated in FIG. 10 is performed as an additional process of the process of S36, for example, while the ECU illustrated in FIG. 8 is performing its processing in automated driving. The routine illustrated in FIG. 10 may be repeatedly performed for each of a plurality of predicted paths.

As illustrated in FIG. 10, the ECU 10A can perform the processes of S51 to S54 for each predicted path as the additional process of S36. In S51, the ECU 10A acquires priority information using the target path identifying unit 16A. The target path identifying unit 16A acquires the priority of the vehicle and the priority of a mobile object in a relationship between the vehicle and the mobile object as priority information, for example, based on the position of the vehicle on the map, the position of the mobile object on the map, and the map information.

In S52, the ECU 10A determines whether the priority of the mobile object is equal to or higher than the priority of the vehicle using the target path identifying unit 16A. When it is determined that the priority of the mobile object is equal to or higher than the priority of the vehicle (S52: YES), the ECU 10A performs the process of S53. When it is determined that the priority of the mobile object is lower than the priority of the vehicle (S52: NO), the ECU 10A performs the process of S54.

In S53, the ECU 10A identifies the predicted path as a target path using the target path identifying unit 16A. On the other hand, in S54, the ECU 10A does not identify the predicted path as a target path using the target path identifying unit 16A. After the process of S53 or S54 has been performed, the ECU 10A ends the routine illustrated in FIG. 10 and performs the process of S37 in FIG. 8.

As described above, with the automated driving trajectory generating device 20A according to the second embodiment, the predicted acceleration calculating unit 15A calculates a predicted longitudinal acceleration which is generated in a mobile object moving along a predicted path for each predicted path based on the temporary stop position or the deceleration position of the mobile object located on the predicted path and the vehicle speed of the mobile object. The target path identifying unit 16A identifies a predicted path in which the maximum value of the predicted longitudinal acceleration is less than the longitudinal acceleration threshold value out of a plurality of predicted paths as a target path. Accordingly, it is possible to more appropriately generate a trajectory for automated driving based on the knowledge that the feasibility of a predicted path in which the maximum value of the predicted longitudinal acceleration generated in a mobile object is equal to or greater than the longitudinal acceleration threshold value is low.

In the automated driving trajectory generating device 20A, the map information includes priority information for defining the priorities under traffic regulations for a plurality of vehicles. The target path identifying unit 16A additionally identifies a target path in which the priority of the mobile object is equal to or higher than the priority of the vehicle out of a plurality of predicted paths. Accordingly, it is possible to more appropriately generate a trajectory for automated driving based on the knowledge that the feasibility of a predicted path in which the priority of a mobile object is lower than the priority of the vehicle is low.

Modified Examples

While exemplary embodiments of the disclosure have been described above, the disclosure is not limited to the embodiments. The disclosure can be embodied in various forms subjected to various modifications and improvements based on the knowledge of a person skilled in the art in addition to the aforementioned embodiments.

For example, the target path identifying unit 16 or 16A may additionally identify a target path extending in a direction which is identified by a direction indication out of a plurality of predicted paths. In this case, the outside environment recognized by the outside environment recognizing unit 12 may include a direction indication by a mobile object. The direction indication is indication for notifying the surroundings of a direction in which the mobile object is going to travel. The outside environment recognizing unit 12 may recognize the direction indication based on an image captured by a camera in which the mobile object appears. The direction indication is, for example, flickering of a direction indicator of the other vehicle. In addition, the direction indication may be indication with a hand signal.

Figure 11:
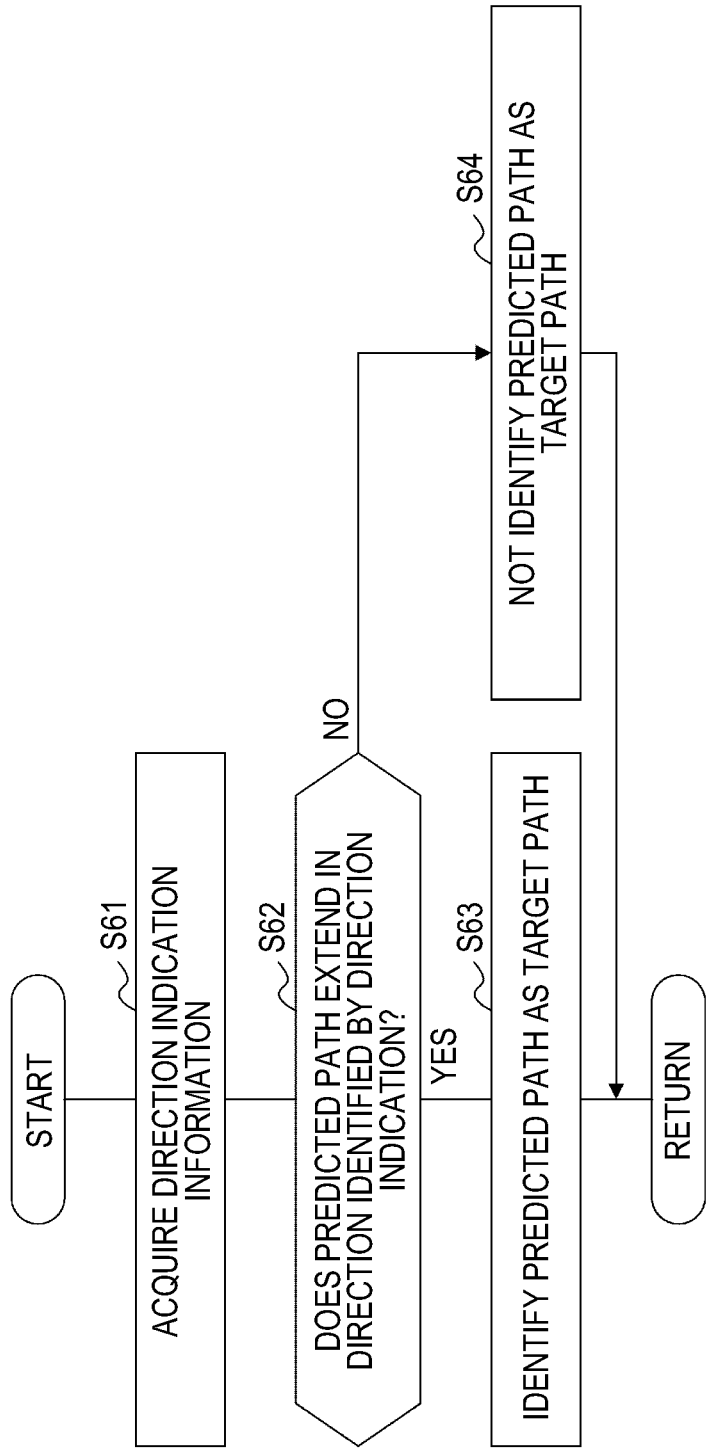
FIG. 11 is a flowchart illustrating another example of the additional target path identifying process.

For example, the ECU 10 or 10A may perform the process of S61 illustrated in FIG. 11 when the number of target paths identified in the routine illustrated in FIG. 4, the routine illustrated in FIG. 9, or the routine illustrated in FIG. 10 is equal to or greater than 2. FIG. 11 is a flowchart illustrating another example of the additional target path identifying process. The routine illustrated in FIG. 11 may be repeatedly performed for each of a plurality of predicted paths.

As illustrated in FIG. 11, in S61, the ECU 10 or 10A acquires direction indication information using the outside environment recognizing unit 12. For example, the outside environment recognizing unit 12 acquires the direction indication based on an image captured by a camera in which a mobile object appears.

In S62, the ECU 10 or 10A determines whether a predicted path extends in a direction identified by the direction indication using the target path identifying unit 16 or 16A. When it is determined that the predicted path extends in the direction identified by the direction indication (S62: YES), the ECU 10 or 10A performs the process of S63. When it is determined that the predicted path does not extend in the direction identified by the direction indication (S62: NO), the ECU 10 or 10A performs the process of S64.

In S63, the ECU 10 or 10A identifies the predicted path as a target path using the target path identifying unit 16 or 16A. On the other hand, in S64, the ECU 10 or 10A does not identify the predicted path as a target path using the target path identifying unit 16 or 16A. After the process of S63 or S64 has been performed, the ECU 10 or 10A ends the routine illustrated in FIG. 11 and performs the process of S07 in FIG. 3 or the process of S37 in FIG. 8.

In this way, the outside environment recognizing unit 12 recognizes a direction indication of a mobile object and the target path identifying unit 16 or 16A additionally identifies a predicted path extending in a direction identified by the direction indication out of a plurality of predicted paths as a target path. Accordingly, it is possible to more appropriately generate a trajectory for automated driving based on the knowledge that the feasibility of a predicted path extending in a direction not identified by a direction indication is low.

For example, the target path identifying unit 16 or 16A may additionally identify a target path extending in a direction corresponding to a bias of a lateral position out of a plurality of predicted paths. In this case, the outside environment recognized by the outside environment recognizing unit 12 may include a bias of a lateral position of a mobile object. The lateral position is a position of the mobile object in a road width direction of a road on which the mobile travels. For example, when another vehicle traveling in an oncoming lane is supposed as a mobile object, the lateral position may be a position of the vehicle in a lane width direction of an oncoming lane in which the other vehicle travels. The lane width direction is a direction which is perpendicular to a white line constituting a lane of a road on the surface of the road. The bias of the lateral position refers to a bias of the lateral position of the mobile object in the road width direction of the road on which the mobile object travels as a whole. The outside environment recognizing unit 12 may recognize the bias of the lateral position based on to which of a pair of ends in the road width direction of the road on which the mobile object travels the lateral position of the mobile object is closer. For example, when another vehicle traveling in an oncoming lane is supposed as a mobile object, it can be predicted that there is a likelihood that the mobile object will travel over a lane in which the vehicle is traveling or to protrude toward the lane in which the vehicle is traveling because the lateral position of the mobile object in the oncoming lane is close to the median.

Figure 12:
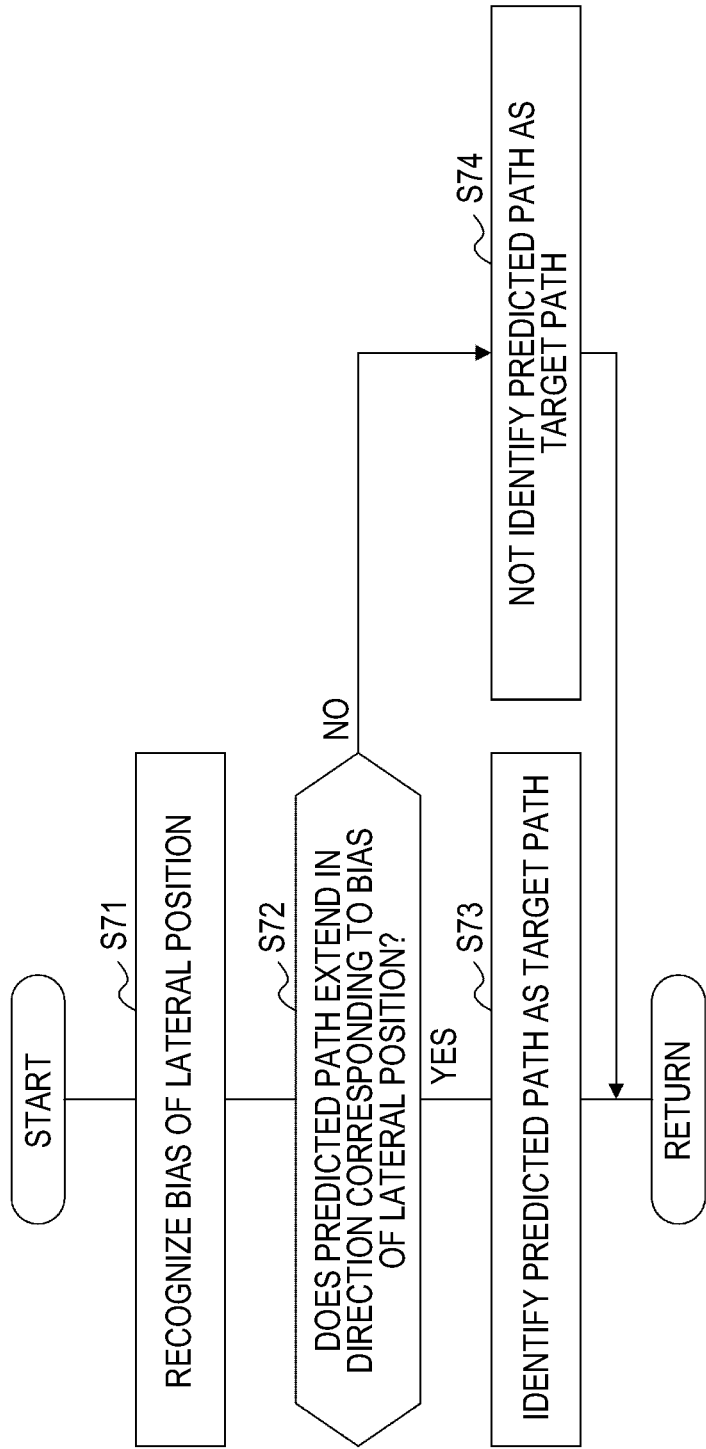
FIG. 12 is a flowchart illustrating another example of the additional target path identifying process.

For example, when the number of target paths identified in the routine illustrated in FIG. 4, the routine illustrated in FIG. 9, the routine illustrated in FIG. 10, or the routine illustrated in FIG. 11 is equal to or greater than 2, the ECU 10 or 10A may perform the process of S71 illustrated in FIG. 12. FIG. 12 is a flowchart illustrating another example of the additional target path identifying process. The routine illustrated in FIG. 12 may be repeatedly performed for each of a plurality of predicted paths.

As illustrated in FIG. 12, in S71, the ECU 10 or 10A recognizes a bias of a lateral position using the outside environment recognizing unit 12. The outside environment recognizing unit 12 recognizes the bias of the lateral position, for example, based on an image captured by a camera in which a mobile object appears.

In S72, the ECU 10 or 10A determines whether the predicted path extends in a direction corresponding to the bias of the lateral position using the target path identifying unit 16 or 16A. When it is determined that the predicted path extends in the direction corresponding to the bias of the lateral position (S72: YES), the ECU 10 or 10A performs the process of S73. When it is determined that the predicted path does not extend in the direction corresponding to the bias of the lateral position (S72: NO), the ECU 10 or 10A performs the process of S74.

In S73, the ECU 10 or 10A identifies the predicted path as a target path using the target path identifying unit 16 or 16A. On the other hand, in S74, the ECU 10 or 10A does not identify the predicted path as a target path using the target path identifying unit 16 or 16A. After the process of S73 or S74 has been performed, the ECU 10 or 10A ends the routine illustrated in FIG. 12 and performs the process of S07 in FIG. 3 or the process of S37 in FIG. 8.

In this way, the outside environment recognizing unit 12 recognizes a bias of a lateral position in a direction crossing a traveling direction of a mobile object and the target path identifying unit 16 or 16A additionally identifies a target path extending in the direction corresponding to the bias of the lateral position out of a plurality of predicted paths. Accordingly, it is possible to more appropriately generate a trajectory for automated driving based on the knowledge that the feasibility of a predicted path extending in a direction not corresponding to the bias of the lateral position is low.

For example, the target path identifying unit 16 or 16A may additionally identify a target path based on a result of recognition of a lighting state of a traffic signal out of a plurality of predicted paths. In this case, the outside environment recognized by the outside environment recognizing unit 12 may include a result of recognition of a lighting state of a traffic signal. The outside environment recognizing unit 12 may recognize a lighting state of a traffic signal in front of the vehicle (whether it is a lighting state in which passing is permitted or a lighting state in which passing is prohibited), for example, based on an image from a camera of the external sensor 2. The outside environment recognizing unit 12 may recognize the lighting state of the traffic signal based on infrastructure information which can be acquired via a communication unit. The target path identifying unit 16 or 16A may determine whether the predicted path extends in a direction in which the lighting state of the traffic signal is a lighting state in which passing is permitted. When it is determined that the predicted path extends in a direction in which the lighting state of the traffic signal is a lighting state in which passing is permitted, the target path identifying unit 16 or 16A may identify the predicted path as a target path. On the other hand, when it is determined that the predicted path extends in a direction in which the lighting state of the traffic signal is a lighting state in which passing is prohibited, the target path identifying unit 16 or 16A may not identify the predicted path as a target path.

In this way, the outside environment recognizing unit 12 recognizes a lighting state of a traffic signal and the target path identifying unit 16 or 16A additionally identifies a predicted path extending in a direction in which the lighting state of the traffic signal is a lighting state in which passing is permitted out of a plurality of predicted paths as the target path. Accordingly, it is possible to more appropriately generate a trajectory for automated driving based on the knowledge that the feasibility of a predicted path extending in a direction in which a lighting state of a traffic signal is a lighting state in which passing is prohibited is low.

For example, the target path identifying unit 16 or 16A may additionally identify a target path based on whether a road on which a vehicle is located is one-way traffic out of a plurality of predicted paths. When a predicted path of a mobile object extends on a road on which the vehicle is located, it is thought that the feasibility of the predicted path is low because the mobile object travels against the one-way traffic. Accordingly, the target path identifying unit 16 or 16A may not identify the predicted path as a target path.

In this way, the outside environment recognizing unit 12 recognizes a lighting state of a traffic signal and the target path identifying unit 16 or 16A additionally identifies a predicted path extending in a direction in which the lighting state of the traffic signal is a lighting state in which passing is permitted out of a plurality of predicted paths as a target path. Accordingly, it is possible to more appropriately generate a trajectory for automated driving based on the knowledge that the feasibility of a predicted path extending in a direction in which a lighting state of a traffic signal is a lighting state in which passing is prohibited is low.

In the aforementioned embodiments, the first trajectory is a trajectory in which the vehicle stops before an interference position, but the disclosure is not limited thereto. For example, when a host vehicle path and a target path interfere with each other, the trajectory generating unit 17 may generate the first trajectory with a steering plan in which the vehicle traveling along the host vehicle path is separated from a mobile object based on the vehicle speed of the vehicle and the interference position with the host vehicle path. The first trajectory may be generated with both a speed plan in which the vehicle stops before the interference position and a steering plan in which the vehicle is separated from the mobile object.

In the aforementioned embodiments, the result of comparison between the predicted lateral acceleration and the lateral acceleration threshold value or the result of comparison between the predicted longitudinal acceleration and the longitudinal acceleration threshold value has been exemplified as a condition for determining a predicted path as a target path, but the disclosure is not limited thereto. For example, the target path identifying unit may identify a target path based on a combined predicted acceleration which is calculated based on the predicted lateral acceleration and the predicted longitudinal acceleration and a result of comparison between the combined predicted acceleration and the acceleration threshold value.

In the aforementioned embodiments, the predicted lateral acceleration and the predicted longitudinal acceleration have been exemplified as the predicted acceleration, but the disclosure is not limited thereto. For example, a predicted value of an acceleration in a vehicle height direction may be used as the predicted acceleration.

In the second embodiment, a target path is identified using the priorities under traffic regulations, but this identification may be omitted. The first embodiment and the second embodiment may be combined. The aforementioned modified examples may be appropriately combined to identify a target path.

In the first embodiment, the maximum value of the predicted lateral acceleration has been compared with the lateral acceleration threshold value, but the disclosure is not limited thereto. For example, in determination of the target path identifying unit, a value with a positive or negative sign may be used as the predicted lateral acceleration and a threshold value with a corresponding positive or negative sign may be used as the lateral acceleration threshold value. The maximum value may not be used. In the second embodiment, the maximum value of the predicted longitudinal acceleration has been compared with the longitudinal acceleration threshold value, but the disclosure is not limited thereto. For example, in determination of the target path identifying unit, a value with a positive or negative sign may be used as the predicted longitudinal acceleration and a threshold value with a corresponding positive or negative sign may be used as the longitudinal acceleration threshold value. The maximum value may not be used. In brief, the target path identifying unit has only to identify a target path based on a result of comparison between a predicted acceleration and an acceleration threshold value.

In the aforementioned embodiments, an automated driving device including an automated driving trajectory generating device is described, but the disclosure is not limited thereto. The disclosure may be embodied in an aspect in which at least the actuator 5 and the travel control unit 18 are omitted and the function of only the automated driving trajectory generating device is provided. In this case, for example, a trajectory generated by the automated driving trajectory generating device may be transmitted from the automated driving trajectory generating device to an automated-driving vehicle via a communication network and used to cause the automated-driving vehicle to travel by automated driving.

What is claimed is:

1. An automated driving trajectory generating device that generates a trajectory for automated driving of a vehicle, the automated driving trajectory generating device comprising:
    a mobile object recognizing unit configured to recognize a mobile object which is located near the vehicle, and recognize a bias of a lateral position in a direction crossing a traveling direction of the mobile object;
    a path calculating unit configured to calculate a host vehicle path for automated driving of the vehicle and a plurality of predicted paths of the mobile object based on a position of the vehicle on a map, a position of the mobile object on the map, and map information;
    a predicted acceleration calculating unit configured to calculate a predicted acceleration which is generated in the mobile object moving along a predicted path for each predicted path based on the plurality of predicted paths and a vehicle speed of the mobile object;
    a target path identifying unit configured to identify a predicted path extending in a direction corresponding to the bias of the lateral position out of the plurality of predicted paths as a target path based on a result of comparison between the predicted acceleration and an acceleration threshold value, the target path being a predicted path used to generate the trajectory; and
    a trajectory generating unit configured to generate the trajectory based on the host vehicle path and the target path.

2. The automated driving trajectory generating device according to claim 1, wherein the predicted acceleration calculating unit is configured to calculate a predicted lateral acceleration which is generated in the mobile object moving along a predicted path for each predicted path based on a radius of curvature of the predicted path and the vehicle speed of the mobile object, and
    wherein the target path identifying unit is configured to identify a predicted path in which a maximum value of the predicted lateral acceleration is less than a lateral acceleration threshold value out of the plurality of predicted paths as the target path.

3. The automated driving trajectory generating device according to claim 1, wherein the predicted acceleration calculating unit is configured to calculate a predicted longitudinal acceleration which is generated in the mobile object moving along a predicted path for each predicted path based on a temporary stop position or a deceleration position of the mobile object which is located in the predicted path and the vehicle speed of the mobile object, and
    wherein the target path identifying unit is configured to identify a predicted path in which a maximum value of the predicted longitudinal acceleration is less than a longitudinal acceleration threshold value out of the plurality of predicted paths as the target path.

4. The automated driving trajectory generating device according to claim 1, wherein the map information includes priority information for determining priorities under traffic regulations for a plurality of vehicles, and
    wherein the target path identifying unit is configured to additionally identify a predicted path in which the priority of the mobile object is equal to or higher than the priority of the vehicle out of the plurality of predicted paths as the target path.

5. The automated driving trajectory generating device according to claim 1, wherein the mobile object recognizing unit is configured to recognize a direction indication of the mobile object, and
    wherein the target path identifying unit is configured to additionally identify a predicted path extending in a direction identified by the direction indication out of the plurality of predicted paths as the target path.

6. An automated driving device that causes a vehicle to travel along a generated trajectory by automated driving, the automated driving device comprising:
    a mobile object recognizing unit configured to recognize a mobile object which is located near the vehicle, and recognize a bias of a lateral position in a direction crossing a traveling direction of the mobile object;
    a path calculating unit configured to calculate a host vehicle path for automated driving of the vehicle and a plurality of predicted paths of the mobile object based on a position of the vehicle on a map, a position of the mobile object on the map, and map information;
    a predicted acceleration calculating unit configured to calculate a predicted acceleration which is generated in the mobile object moving along a predicted path for each predicted path based on the plurality of predicted paths and a vehicle speed of the mobile object;
    a target path identifying unit configured to identify a predicted path extending in a direction corresponding to the bias of the lateral position out of the plurality of predicted paths as a target path based on a result of comparison between the predicted acceleration and an acceleration threshold value, the target path being a predicted path used to generate the trajectory;
a trajectory generating unit configured to generate the trajectory based on the host vehicle path and the target path; and
a travel control unit configured to cause the vehicle to travel along the trajectory by automated driving,
wherein the trajectory generating unit is configured to calculate an interference position between the host vehicle path and the target path when the host vehicle path and the target path interfere with each other, and generate an interference avoidance trajectory which is the trajectory in which the vehicle is stopped before the interference position based on a vehicle speed of the vehicle, the host vehicle path, and the interference position, and
wherein the travel control unit is configured to decelerate the vehicle along the interference avoidance trajectory.

* * * * *